United States Patent [19]

Sugahara et al.

[11] Patent Number: 5,293,024

[45] Date of Patent: Mar. 8, 1994

[54] MACHINING APPARATUS WITH AUTOMATIC RESTART FUNCTION

[75] Inventors: Masayuki Sugahara; Hitoshi Ozawa; Kiyoshi Hattori, all of Aichi, Japan

[73] Assignee: Mitsubishi Denki Kabushiki Kaisha, Tokyo, Japan

[21] Appl. No.: 955,316

[22] Filed: Oct. 1, 1992

[30] Foreign Application Priority Data

Oct. 7, 1991 [JP] Japan .................................. 3-258854
Feb. 13, 1992 [JP] Japan .................................. 4-26539

[51] Int. Cl.⁵ ............................................. B23K 26/00
[52] U.S. Cl. ............................ 219/121.67; 219/121.83
[58] Field of Search ..................... 219/121.67, 121.72, 219/121.83; 364/474.08

[56] References Cited

U.S. PATENT DOCUMENTS 3,764,775 10/1973 Hasslinger et al. ............ 219/121.67
4,469,930 9/1984 Takahashi ....................... 219/121.72

*Primary Examiner*—C. L. Albritton
*Attorney, Agent, or Firm*—Sughrue, Mion, Zinn, Macpeak & Seas

[57] ABSTRACT

A laser cutting apparatus which allows cutting to be automatically restarted or redone without intervention from an operator once a cutting error or fault occurs. In a first embodiment, when the fault occurs the apparatus discontinues processing on the product corresponding to the fault. Thereafter, it moves to, and restarts cutting at, a starting position of the next product to be cut. In a second embodiment, the apparatus corrects a fault and continues cutting on the product corresponding to the fault by restarting cutting at the fault point. It determines whether a restart is possible at the point of the fault based on the type or definition of the fault. If a predetermined number of restarts are attempted at the point of fault without a successful restart, then the apparatus moves to a new start position. In another embodiment, the apparatus uses a profile sensor to prevent machine damage by sensing the position of the cutting head relative to the workpiece.

20 Claims, 17 Drawing Sheets

FIG. 4
```
N40    G1    X100.;
N50    M198;
N60    G0    Y100;
N70    M200;
N80    M121;
N90    G1    X200;
```
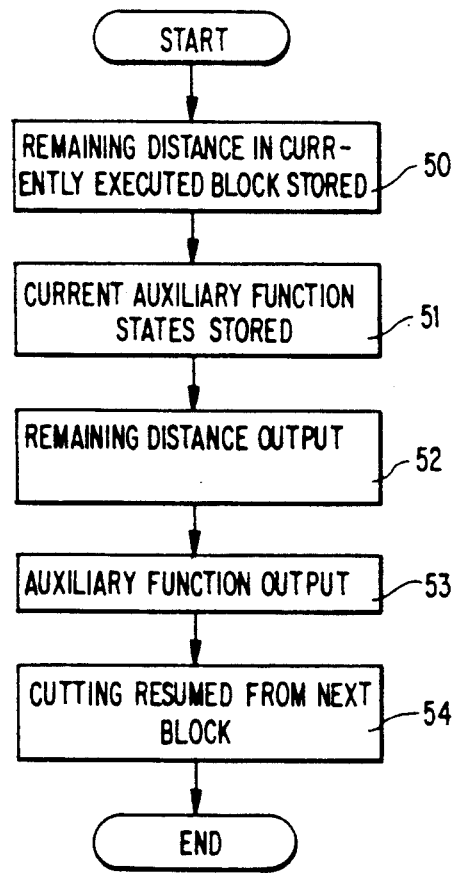
FIG. 6
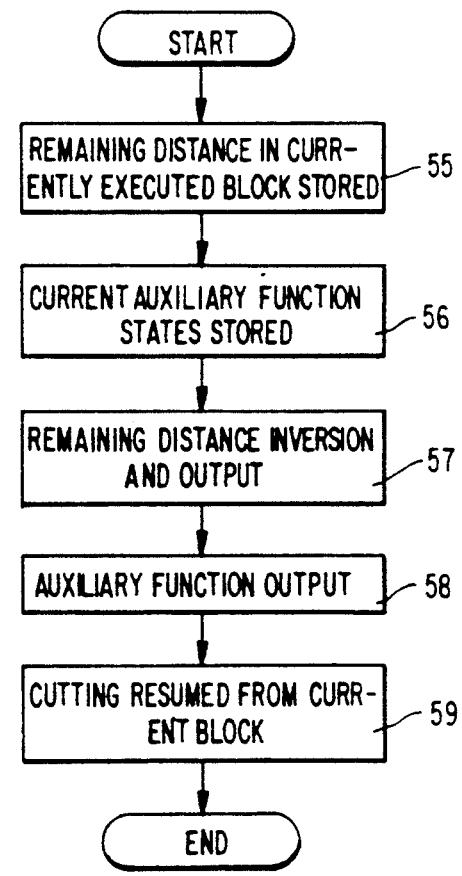
FIG. 7

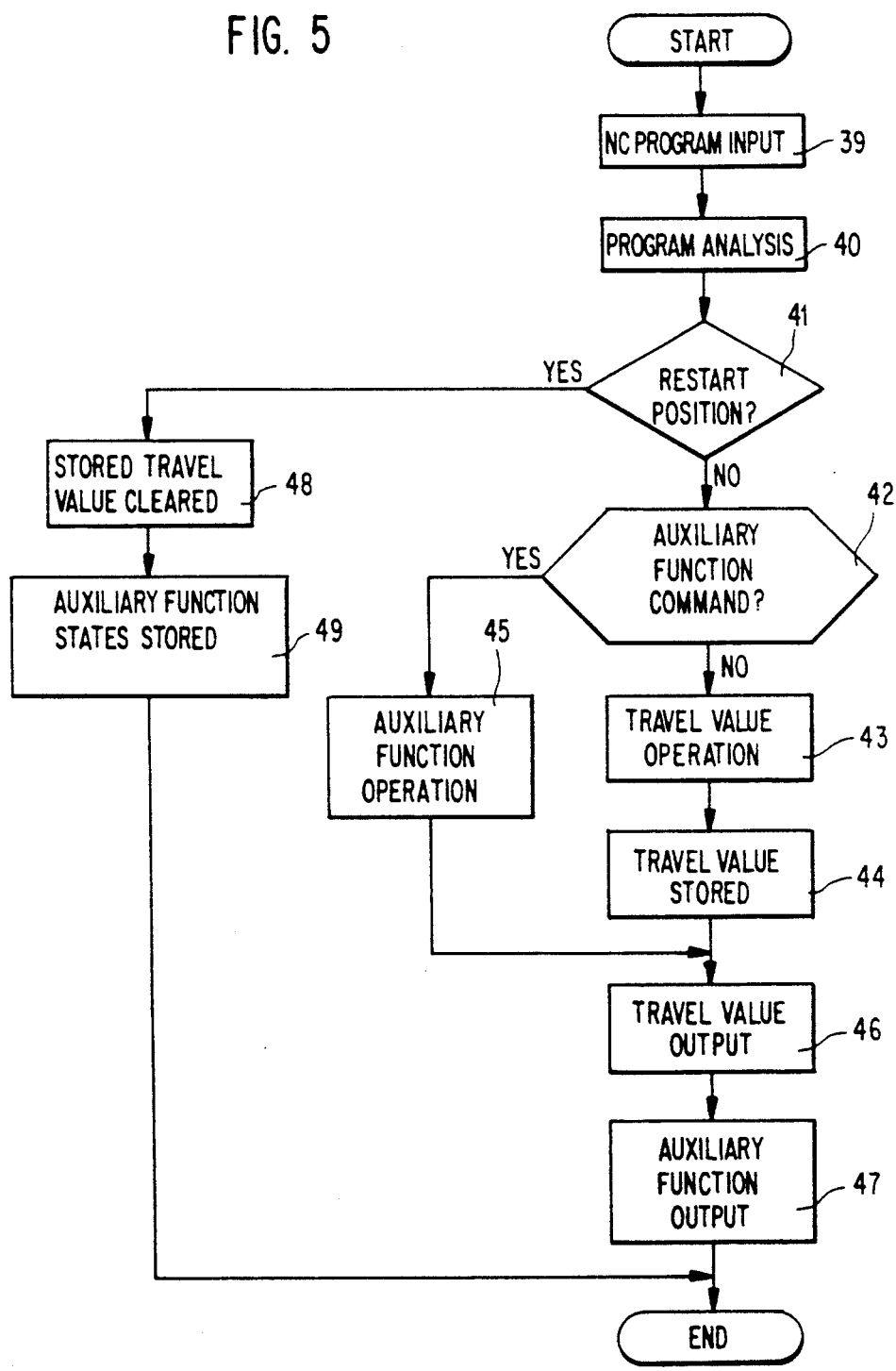

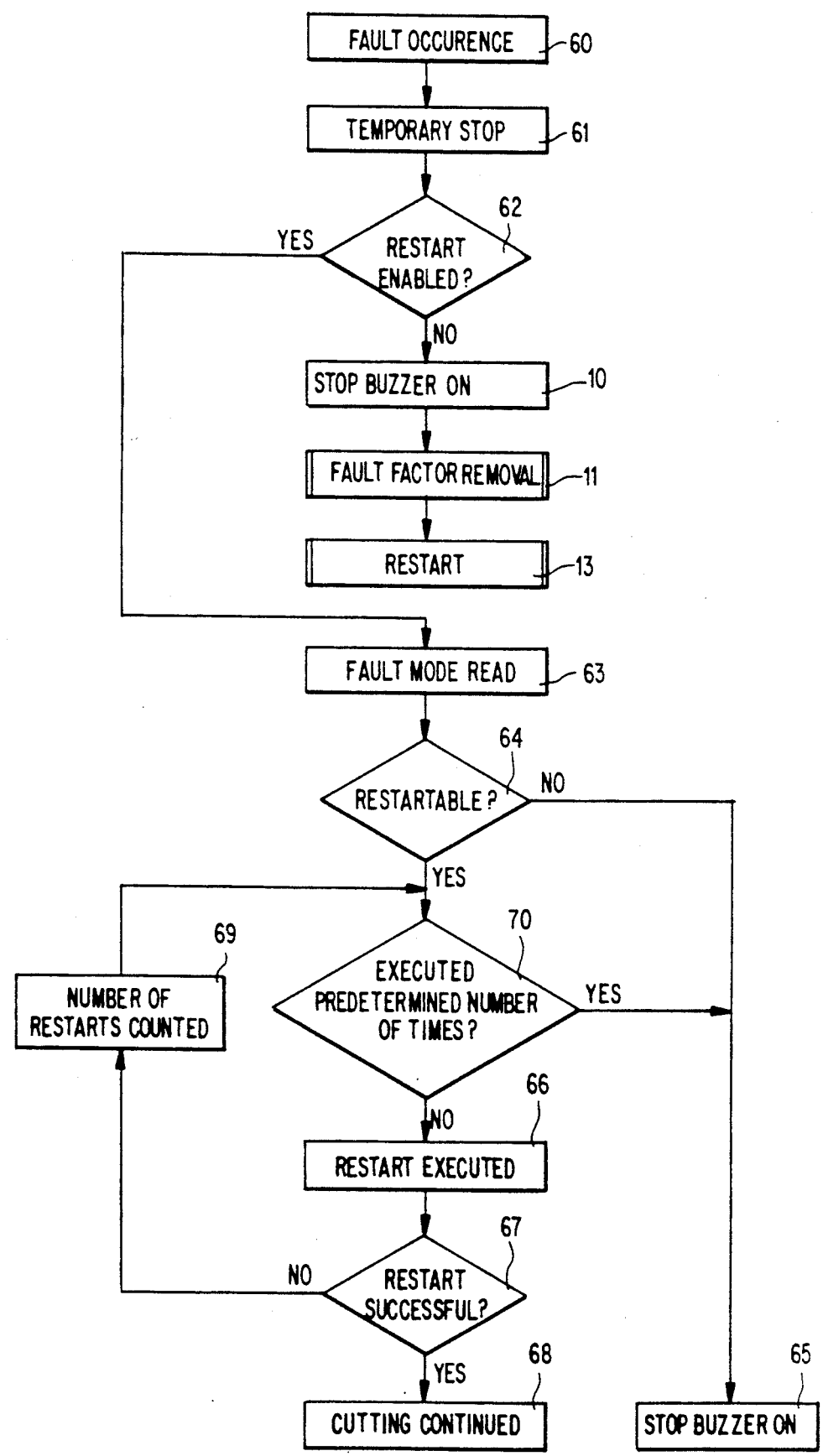

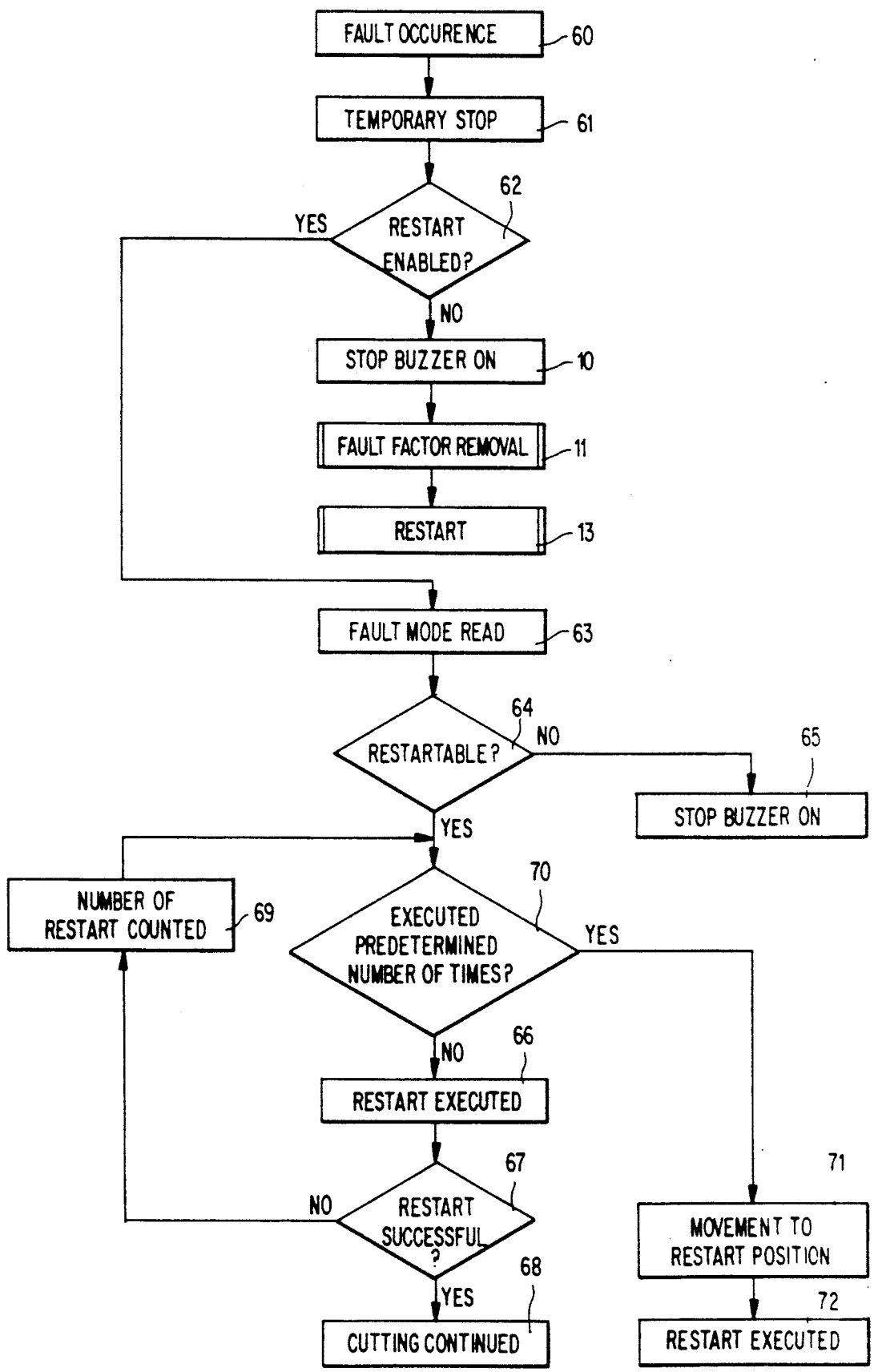

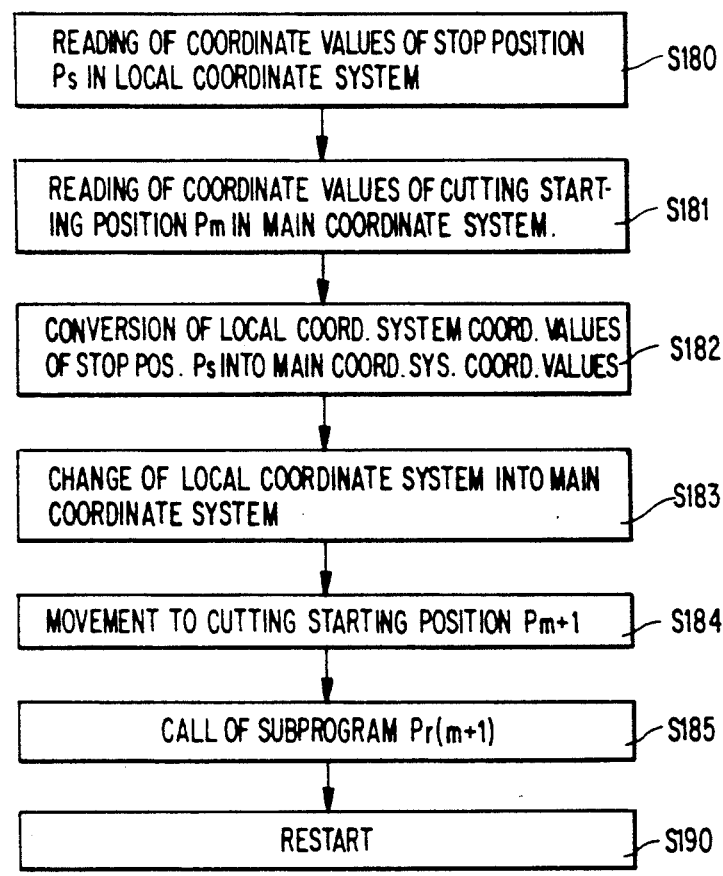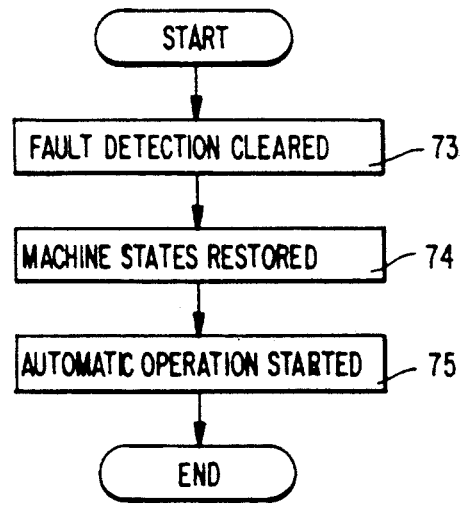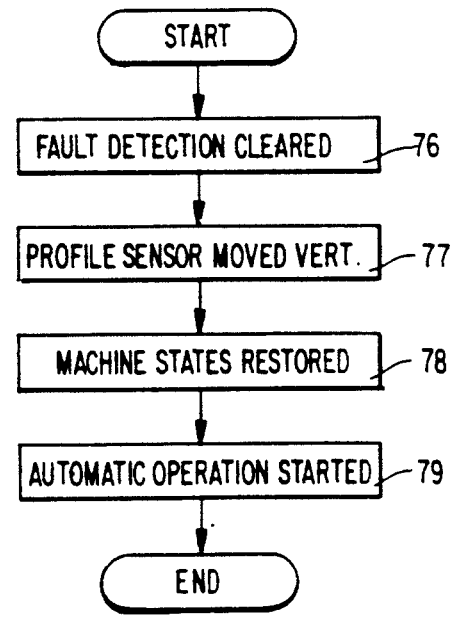

FIG. 15
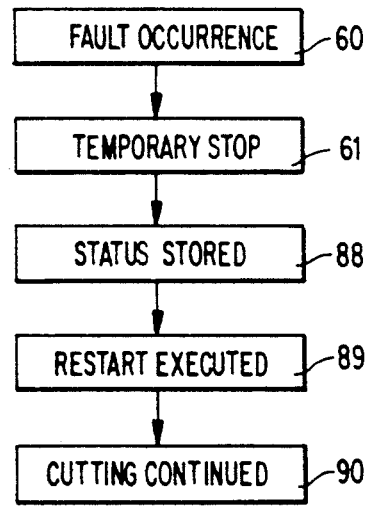
FIG. 16
| DATE | O | N | B | FAULT DEFINITION |
|---|---|---|---|---|
| 91/06/30 | 100 | 10 | 5 | PROFILE FAULT |
| 91/06/30 | 100 | 30 | 10 | NOZZLE TOUCH |
FIG. 17
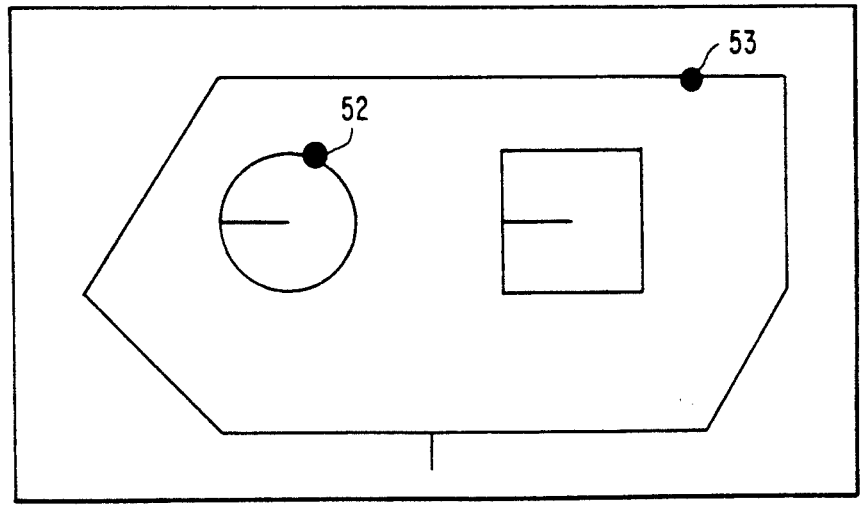

CUTTING PROGRAM Pr(0)
EXECUTION SEQUENCE

CUTTING PROGRAM Pr(0)
EXECUTION SEQUENCE

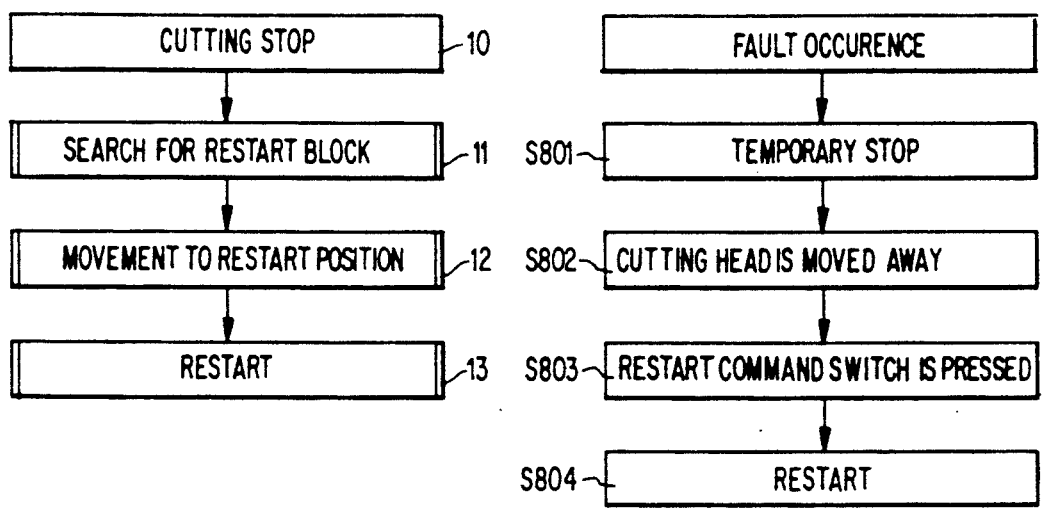
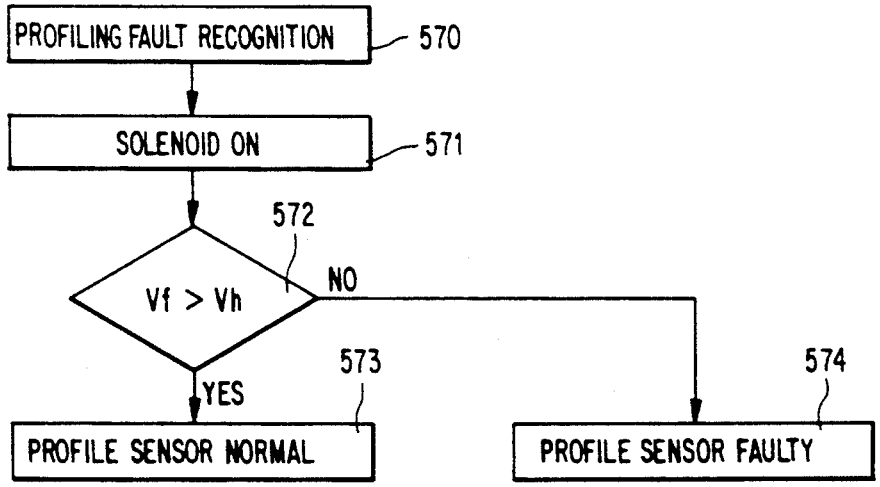
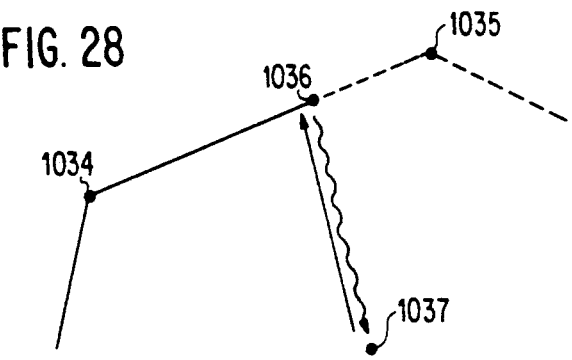

MACHINING APPARATUS WITH AUTOMATIC RESTART FUNCTION

FIELD OF THE INVENTION

The present invention relates to a laser cutting machine and particularly to a laser cutting machine which can perform an automatic restart to resume an unattended cutting operation after a fault occurs, without user intervention, e.g., at night.

BACKGROUND OF THE INVENTION

FIG. 21 illustrates a conventional laser cutting machine, which includes a laser oscillator 1 that radiates a laser beam 2. The beam is reflected from a mirror 3 in a predetermined direction onto a condenser 4, which gathers and focuses the laser beam 2. A workpiece 5 is set in the focusing position of the condenser 4 and is supported by a support 6. A cutting head 7, which includes the condenser 4, also has a nozzle 8 at its front end. A profile sensor 9 detects a distance between the condenser 4 and workpiece 5, while a solenoid 10 raises and lowers the profile sensor 9. An x-axis motor 11 moves the workpiece 5 in an X axis direction, a Y-axis motor 12 moves the workpiece 5 in a Y axis direction and a Z-axis motor 13 moves the cutting head 7 in a Z axis direction. A cutting table 14 is moved in the X and Y directions by the X-axis motor 11 and Y-axis motor 12. A control box 15 controls the cutting table 14, the cutting head 7 and the laser oscillator 1. A numerical controller 16 (hereinafter referred to as the "NC unit"), is contained in the control box 15. This unit comprises a central processing unit (CPU) 17, a ROM 18 for storing a system program that controls the NC unit 16 and a RAM 19 for storing cutting programs, parameters and other various data. The NC unit 16 also includes an interface 20 for transferring analog and digital signals to and from external devices, a graphic control circuit 21 (including servo amplifiers equivalent to the interfaces to the motors) for converting data processed by the CPU 17 into display signals, and display 22, such as a CRT or a liquid crystal display. A key switch unit 23 comprises various key switches, the signals from which are input to the NC unit 16. A relay unit 24 is switched on/off by a signal output from the NC unit 16. A switch 25 performs an automatic power shut-off validation function. An earth leakage circuit breaker 26 with a test lead terminal (hereinafter referred to as the "main breaker") delivers power to the laser cutting machine, and a relay 27 with normally closed contacts is connected to the test lead terminal of the main breaker 26. The test lead terminal is used to check by means of an external signal that the earth leakage circuit breaker is operative when an earth leakage occurs. A tactile sensor is installed in the periphery of the cutting head 7. The contact type sensor, illustrated as the profile sensor 9 (FIG. 21) makes contact with the surface of the workpiece 5 and moves vertically according to the unevenness of the surface of the workpiece 5. Another sensor, such as a capacitance sensor or an optical sensor, may be substituted for the profile sensor 9.

The operation of the laser cutting machine will now be described. By switching on the main breaker 26, the laser cutting machine is fed with electricity and is ready for operation. A command from the control box 15 causes the laser oscillator 1 to radiate the laser beam 2. The laser beam 2 is reflected by the mirror 3 onto the condenser 4. The laser beam 2 is gathered by the condenser 4 into a minute spot diameter (the position where the beam is gathered is referred to as the "focus position").

The distance between the workpiece 5 and condenser 4 is detected by the profile sensor 9, which generates a corresponding electrical signal (hereinafter referred to as the "focus distance detection voltage"). The control box 15 compares a set position voltage and the focus distance detection voltage, and drives the Z-axis motor 13 and moves the cutting head 7 vertically to maintain a set distance between the workpiece and cutting head. This control causes the laser beam 2 to focus the beam on a spot on the workpiece 5, thereby concentrating a large amount of energy on one point and forming a hole in the workpiece 5. This workpiece 5 can be cut into an optional shape by using the X-axis motor 11 and Y-axis motor 12 to move it according to commands from the control box 15.

The laser cutting machine is capable of non-contact cutting, as described above, and does not generate large noise as is produced by a press. The laser is also suited for night-time unmanned automatic operation.

An example of a night-time untended automatic operation procedure for the laser cutting machine will now be described in accordance with FIGS. 22 and 23. Before going home, an operator sets a relatively large work piece 5 on the cutting table 13 to be cut during the night. The operator then calls from the NC unit 16 a cutting program Pr(0) having a multiplicity of product cutting programs Pr(1) to Pr(n) as subprograms (see FIGS. 22(a) and (b)). The operator also validates the automatic power shut-off switch 25 on the control box 14 and sets the automatic operation start switch (not shown) to "ON". After making sure that automatic operation has started, the operator goes home.

The laser cutting machine operates in accordance with commands registered in the cutting program Pr(0) which consists of steps S501 to S562 (FIG. 22(a)) and automatically turns out a multiplicity of products during the night. A program end code M30, registered at the end of the cutting program Pr(0), is executed to stop the automatic operation. When the program end code M30 is executed, the automatic power shut-off function initiates its operation. The automatic power shut-off function automatically performs the operator's procedure of stopping the laser cutting machine in accordance with a program (automatic power shut-off means) stored beforehand in the memory of the NC unit 16. When the relay 27 is finally switched ON by the command from the NC unit 16, the normally closed contacts of the relay 27 open. The normally closed contacts of the relay 27 are connected to the test lead terminal of the main breaker 26. When the normally closed contacts of the relay 27 open, the main breaker 26 operates to shut the power off, stopping the power supply to the laser cutting machine. This reduces the power consumed by the system.

Coming to the job site the next morning, the operator removes the N finished pieces from the cutting table 13, thereby terminating the night unmanned automatic operation. FIG. 22(b) indicates plural products A of rectangular shape and the arrows represent cutting directions. If a fault occurs during the night-time unattended automatic operation, the control box 15 detects the fault and stops the system.

An exemplary cutting operation wherein the cutting program Pr(0) is executed without fault will now be described with reference to FIGS. 22(a) and 22(b). The commands in the cutting program Pr(0) are assumed to be as follows: moving the cutting head from a cutting program starting position P0 to a cutting starting position P1 (step S501); calling and executing the subprogram Pr(1) (step S502); moving to a next cutting starting position P2 (step S503); calling and executing the subprogram Pr(2) (step S504); repeating the calling, executing, and moving operations until the final subprogram Pr(n) is executed (step S550); moving the cutting head to a cutting end position Pend (step S561); executing the program end code M30 (step S562); and terminating the cutting program Pr(0). The above operation results in N finished pieces An exemplary cutting operation is illustrated in FIG. 23(a) and 23(b), wherein a fault occurs in the subprogram Pr(m) during the execution of the cutting program Pr(0). Although the cutting program Pr(0) is run without fault from the subprogram Pr(1) to subprogram Pr(m-1), cutting is stopped due to a fault somewhere between the subprogram Pr(m) and subprogram Pr(n). For this reason, the number of products turned out equals (M-1) which is less than N. The fault occurs at position Ps in FIG. 23(b).

The conventional laser cutting machine is arranged as described above. If a fault takes place, for example, during night-time unmanned operation, the control box 15 detects the fault and stops the system, terminating cutting in an unfinished state. Hence, the unfinished products must be cut the next day. FIG. 24 illustrates a processing flowchart for resuming the cutting processing procedure at a time when a faulty cutting condition occurs during automatic operation and a cutting stop command is given by the control box 15. However, in FIG. 24, cutting is resumed at a position different from the cutting stop position.

When the laser cutting is stopped due to a fault or the like in step 10, the operator examines a cutting error or the fault factors and takes appropriate corrective action. Next, the operator searches for a block in the NC program where cutting is to be resumed in step 11, moves the cutting head 7 to the resumption position corresponding to the resumption block in step 12, and restarts cutting at that position in step 13. Often the cutting operation is stopped by a signal from the profile sensor 9 due to a fault, in which the tip of the profile sensor 9 is welded to the workpiece 5. This welding effect results from spattering or the like produced during piercing (drilling at a cutting start) or other work. When this welding fault occurs, it is necessary to determine whether the profile sensor 9 is normal or not before restarting the system.

FIG. 25 illustrates a processing flowchart used to judge whether the fault which has occurred is the welding of the profile sensor 9. Referring to FIG. 25, if a profiling fault is detected in the signal from the profile sensor 9 in step 570, the solenoid 10 is switched on in step 571 to attempt to raise the profile sensor 9. Once the solenoid 10 attempts to raise the sensor 9, a detection voltage Vf representing the position of the profile sensor 9 is compared with a judgement reference voltage Vh in step 572. The judgement reference voltage Vh employed is a voltage which should be exceeded by the profile sensor 9 detection voltage when the profile sensor 9 is raised ordinarily. Accordingly, if Vf>Vh, the profile sensor 8 has been raised normally. In this case, processing under a normal condition is performed in step 573. Conversely, if Vf≦Vh, the system determines that the profile sensor 9 has not been raised ordinarily for some reason, and fault processing is carried out in step 574.

In the known laser cutting machine, when this processing is carried out, the operator must perform complicated and troublesome operations until cutting is resumed. In addition, if a fault occurs during unmanned automatic operation, e.g., night-time operation, cutting remains stopped until the user arrives the next day upsetting a production schedule.

SUMMARY OF THE INVENTION

It is accordingly an object of the present invention to overcome the disadvantages noted above by providing a laser cutting machine that allows production to be resumed on an unattended basis once a fault occurs by making an automatic restart at a position different from a fault position (or at the fault position for some faults), in order to continue cutting.

Another object is to provide a laser cutting machine which allows cutting to be resumed or redone easily without requiring the operator to remember complicated and troublesome operations. An automatic restart can be performed by simple re-cutting command means, starting from a different position specified in a program or from the end point or starting point of a current block when a cutting error or fault takes place during automatic operation.

Another object is to provide a laser cutting machine that allows automatic operation to be continued on an unattended basis without wasting products being cut, thereby improving productivity. A restart can be made automatically from a position where a cutting error, fault or the like has occurred, according to the judgement of the definition of the cutting error, fault or the like when the cutting error, fault or the like occurs during automatic operation. Also, an alarm is provided or a restart is made from a different position once the number of automatic restarts counted exceeds a predetermined number, in order to minimize wasted products when cutting cannot be resumed from the fault position.

Another object is to provide a laser cutting machine which allows a fault occurrence status to be checked after cutting, enabling proper management of the machine.

Another object is to provide a laser cutting machine which allows a fault to be checked where a position detected by a profile sensor is offset from an original position or where a contactless sensor, e.g., an electrostatic capacity type sensor, is employed, whereby the machine can be prevented from being damaged due to a sensor fault when cutting is restarted and resumed.

Another object is to provide a laser cutting machine which allows a fault occurrence position to be stored at the occurrence of a fault and a cutting head to be moved to the fault occurrence position by pressing a cutting resumption switch, whereby operation is facilitated and cutting time loss is eliminated.

BRIEF DESCRIPTION OF THE DRAWINGS

FIG. 4 is a program example for illustrating restart execution processing beginning with a restart position operation for the restart of the laser cutting machine in the first embodiment of the present invention.

FIG. 5 is a NC program execution processing flowchart for a laser cutting machine in a second embodiment of the present invention.

FIG. 6 a restart execution processing flowchart beginning with a restart position operation for a laser cutting machine in a third embodiment of the present invention.

FIG. 7 is a restart execution processing flowchart beginning with a restart position operation for a laser cutting machine in a fourth embodiment of the present invention.

FIG. 8 is an automatic restart processing flowchart for a laser cutting machine in a fifth embodiment of the present invention.

FIG. 9 is an automatic restart processing flowchart for a laser cutting machine in a sixth embodiment of the present invention.

FIG. 11 is a restart position movement processing flowchart.

FIG. 12 is a restart executing processing flowchart in the sixth embodiment of the present invention.

FIG. 13 is a restart executing processing flowchart in a seventh embodiment of the present invention.

FIG. 15 is an automatic restart processing flowchart for a laser cutting machine in a ninth embodiment of the present invention.

FIG. 16 is a screen display view of a restart status in the ninth embodiment of the present invention.

FIG. 17 is a screen display view of a restart status in a tenth embodiment of the present invention.

FIG. 24 is a restart processing flowchart in the conventional laser cutting machine.

FIG. 25 is a sensor welding judgement processing flowchart in the conventional laser cutting machine of the prior art.

FIG. 26 illustrates a cutting resumption flowchart.

FIG. 28 illustrates the operations performed when cutting is resumed.

DESCRIPTION OF THE PREFERRED EMBODIMENTS

Figure 1:
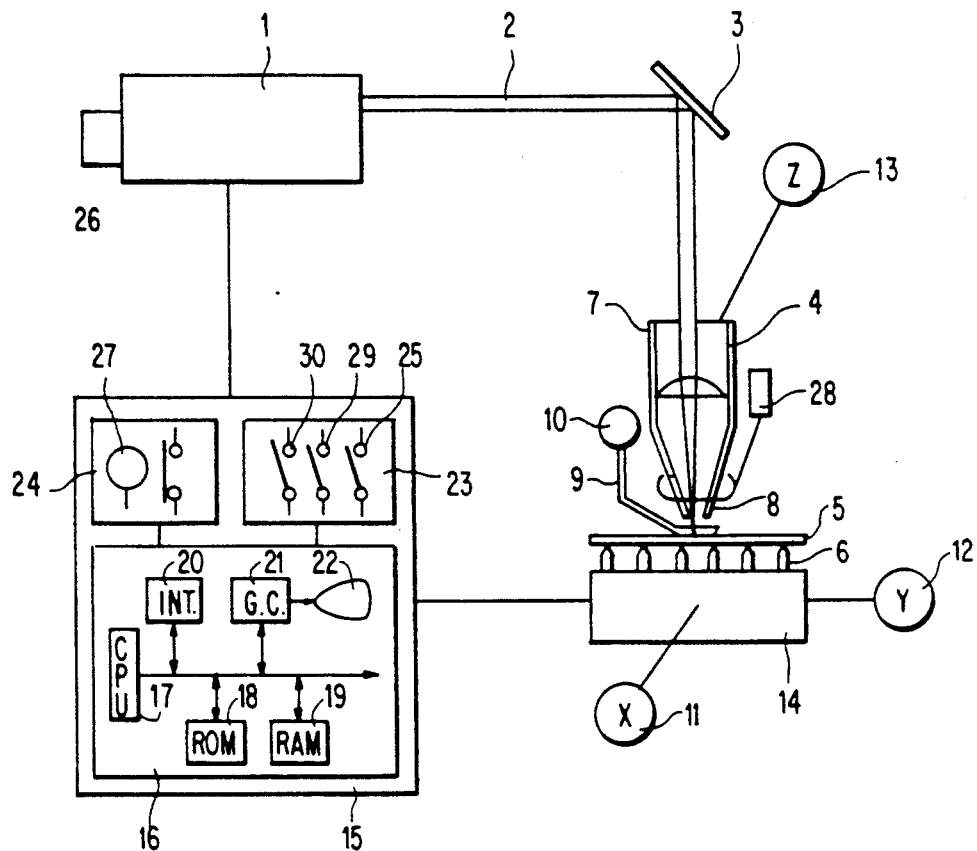
FIG. 1 is diagram of a laser cutting machine illustrating a first embodiment of the present invention.
Figure 2:
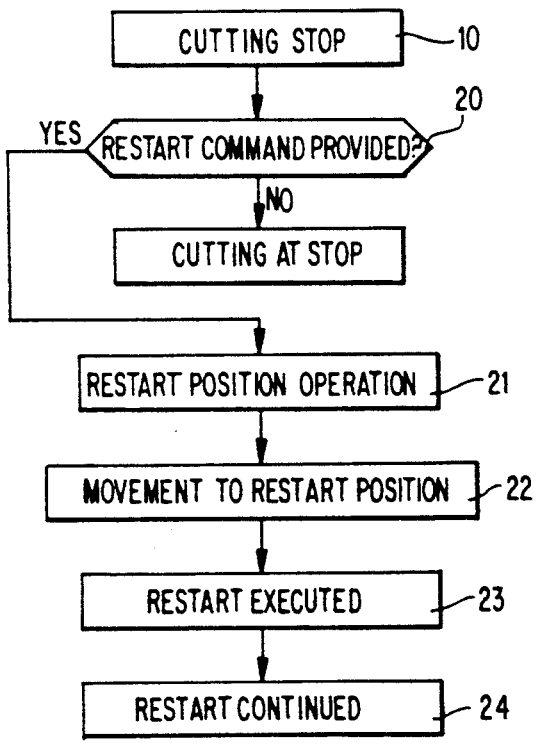
FIG. 2 is a restart/processing flowchart for the laser cutting machine in the first embodiment of the present invention.
Figure 21:
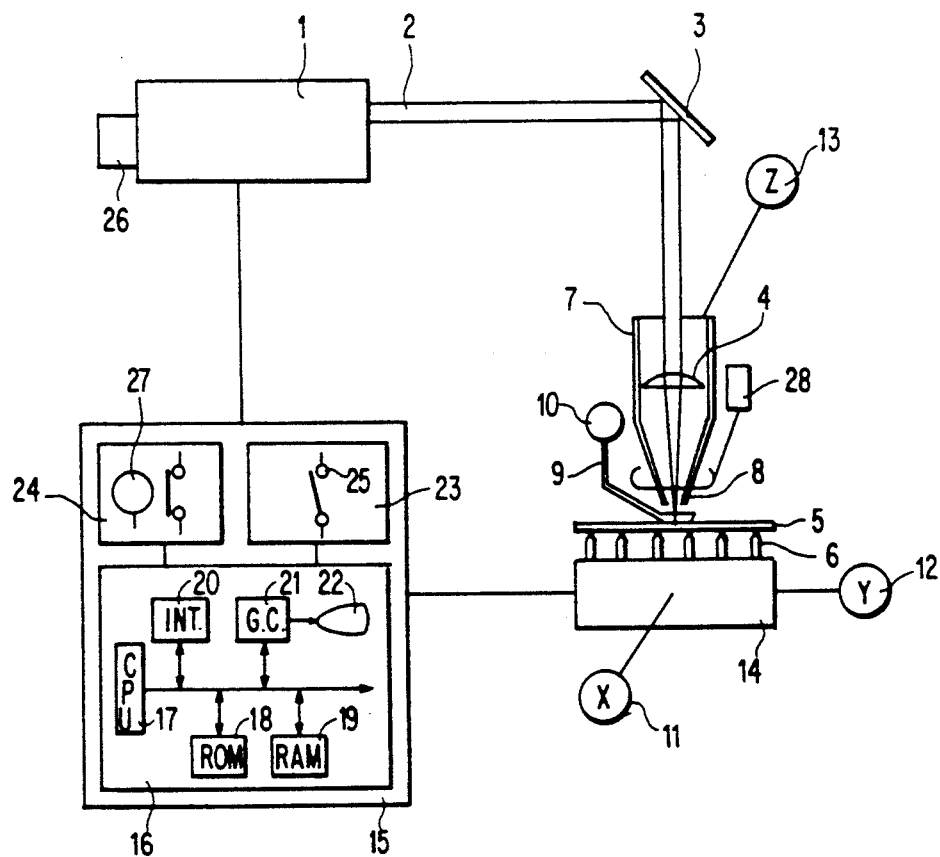
FIG. 21 is a diagram of a conventional laser cutting machine.

FIG. 1 is a diagram of a laser cutting machine illustrating a first embodiment of the present invention, wherein reference characters identical to those in FIG. 21 designate identical or corresponding parts. The present machine also includes a re-cutting command switch 30 (FIG. 1). FIG. 2 illustrates a restart processing flowchart which is used after a fault occurs in the first embodiment of the laser cutting machine. This process resumes cutting or starts re-cutting from a position different from a position at which the fault occurred.

Figure 22A:
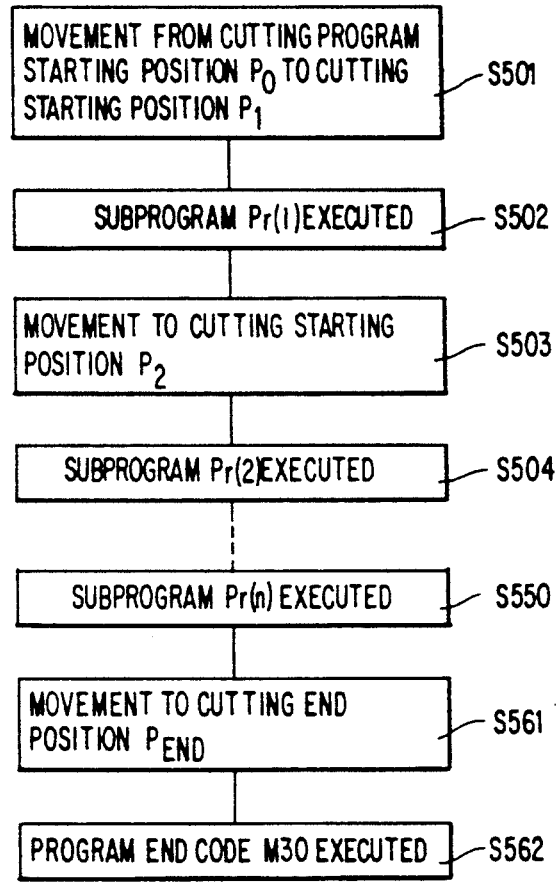
FIGS. 22(a) and 22(b) illustrate a cutting shape and a cutting program execution sequence for the conventional machine where cutting is carried out without a fault.
Figure 22B:
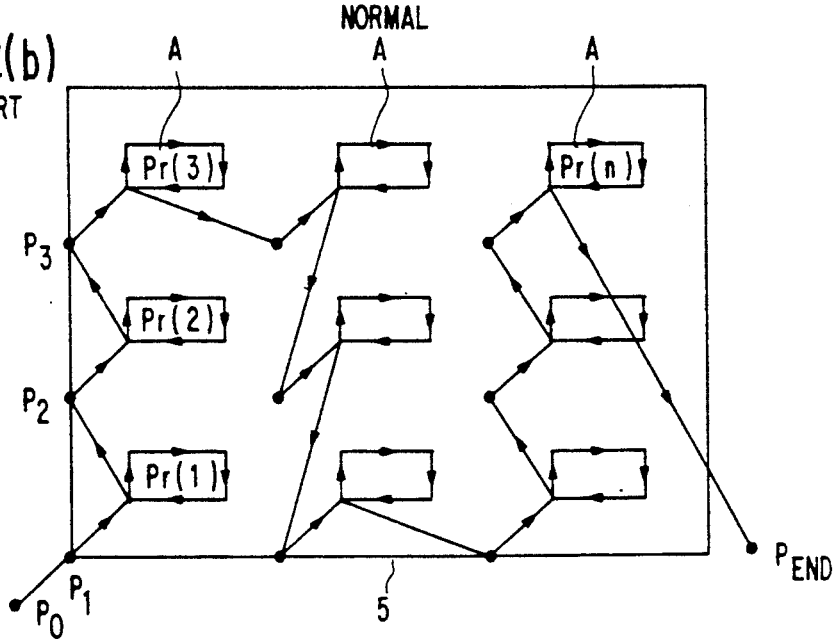
Figure 23A:
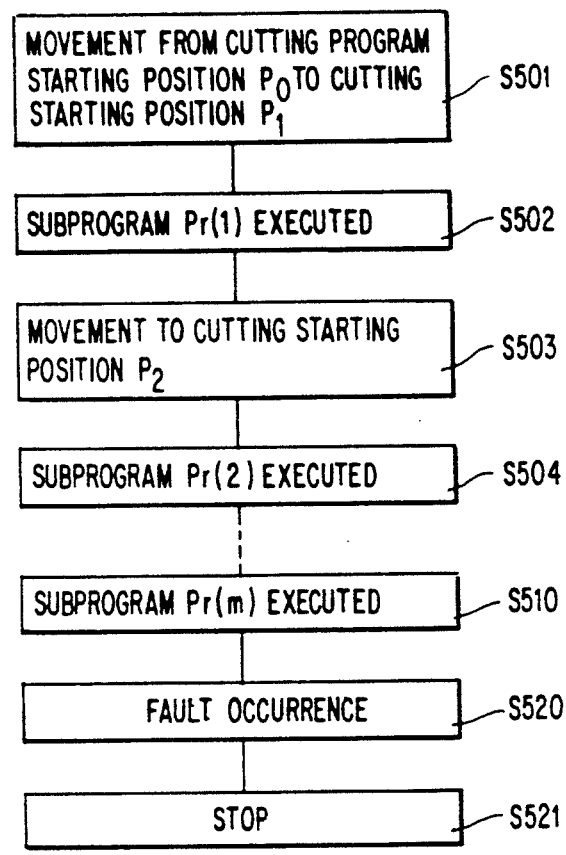
FIGS. 23(a) and 23(b) illustrate a cutting shape and a cutting program execution sequence for the conventional machine where a fault occurs during cutting.
Figure 23B:
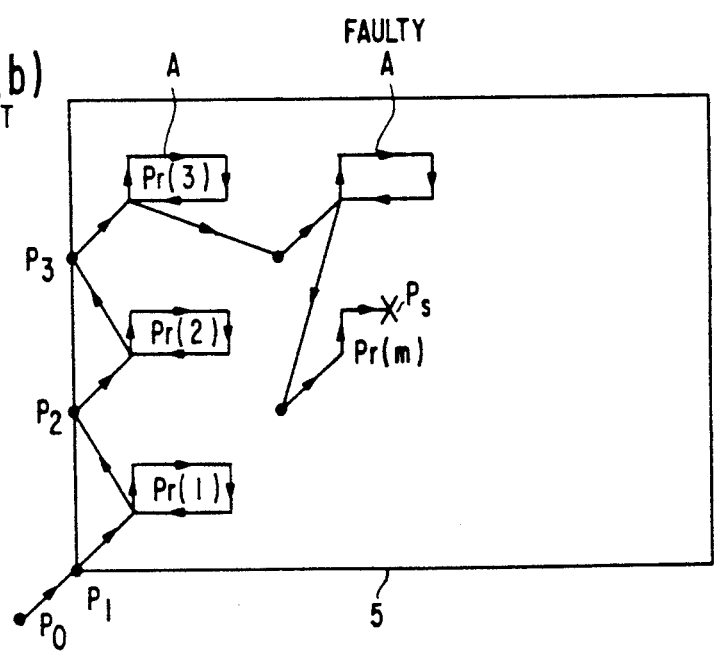

In FIG. 2, when laser cutting stops in step 10, the operator examines a cutting error or the fault factors and takes appropriate corrective action. If a re-cutting command remains unentered (i.e., if the command is invalid), the cutting operation is not restarted and the same operation as described in FIG. 22 is required to resume cutting. However, when the re-cutting command is entered (valid), this command is detected in step 20 and processing moves to step 21. The re-cutting command signal is entered or set via the re-cutting command switch 30 provided on the control box 15. A restart position is operated upon in step 21. Thereafter, the machine moves to an appropriate restart position (i.e., positions $P_1$, $P_2$ and $P_3$ illustrated in FIGS. 22(b) and 23(b)) in step 22, according to the result of operation, and a restarting operation is executed in step 23. Cutting is continued in step 24

Figure 3:
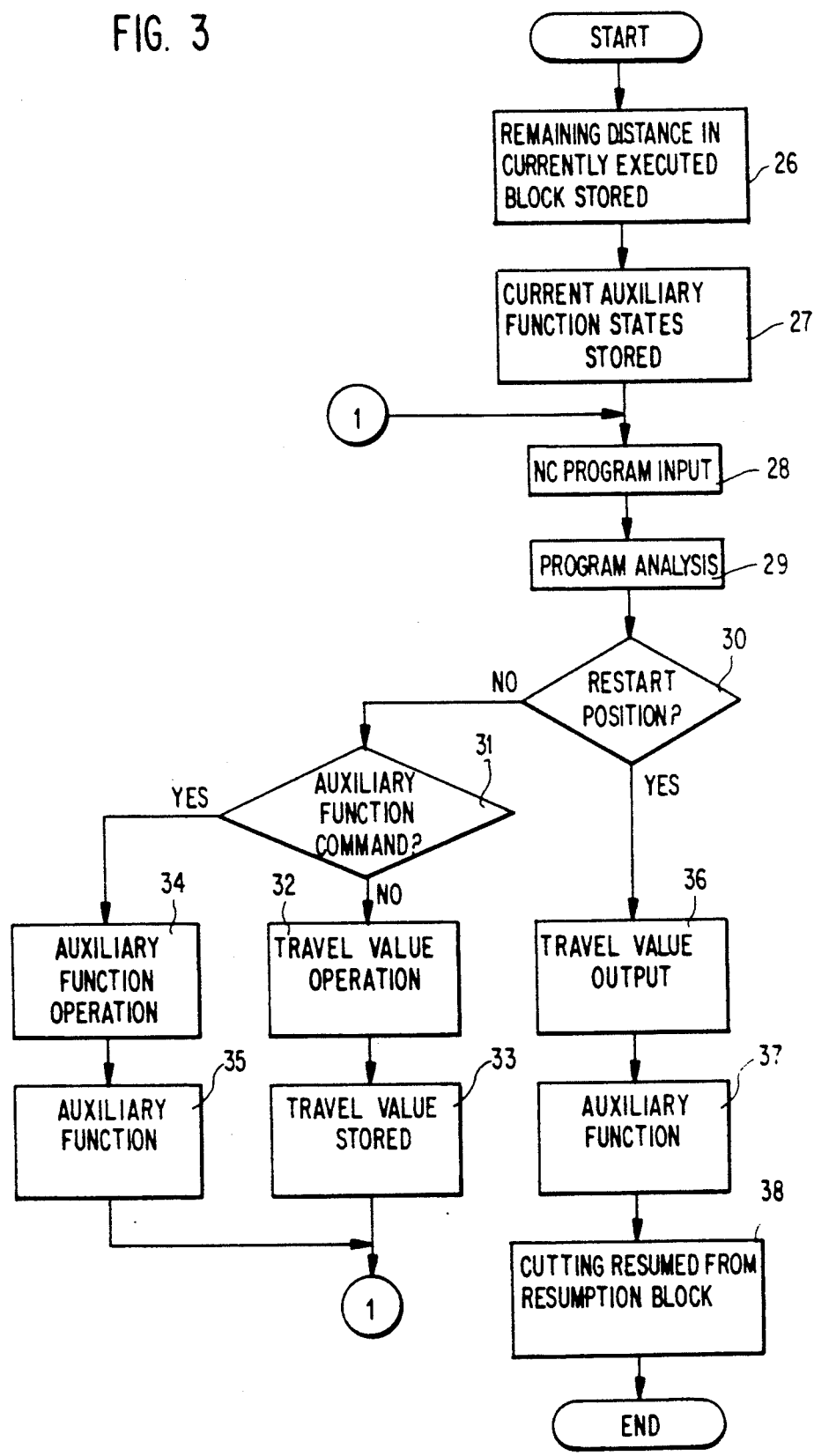
FIG. 3 is a restart execution processing flowchart beginning with a restart position operation for the laser cutting machine in the first embodiment of the present invention.

The processing sequence from the restart position operation to restart execution in the first embodiment will now be described with reference to FIG. 3. In the restart position operation, a remaining travel distance is stored in memory (step 26). This distance represents a remaining un-cut portion of a section of the workpiece, which corresponds to a section of a program block Pr(1) that was being executed but had not finished when the cutting operation stopped. In step 27, the memory stores the radiation level of the laser beam 2, the profile function, the cutting gas and other on/off states and cutting condition states (hereinafter referred to as the "auxiliary function" states) of the laser cutting machine when the cutting operation stopped. In step 28, the NC program command for the next program block is entered. In step 29, the contents of the entered program command are analyzed. In step 30, it is determined whether or not the entered command is a restart position. The restart position is represented by a specific command code in the program. If this command code is not identified in the analysis in step 29, the command is not a restart position and the processing moves on to step 31.

In step 31, it is determined whether or not the command is an auxiliary function command, such as a laser beam 2 on/off command or a move command. If the command is a move command, a travel value is operated upon in step 32 and the result of the operation is added to the travel distance stored in the step 26 and the resultant travel value is stored in memory in step 33. For instance, the travel value may contain a value corresponding to the X, Y and Z coordinate axes and operations performed in steps 32 and 33 add an appropriate amount to each axial value defined in the block just analyzed. If the command is an auxiliary function comtents of the auxiliary function command. The corresponding auxiliary function state stored in the step 27 is updated and stored in step 35. Hereafter, the operation between the NC program entry in step 28 and the updating of the travel value in step 33 or the updating of the auxiliary function state in the step 35 is repeated until the command code denoting a restart position is entered.

The stored travel values indicate the distance between the new restart position of the NC program and the cutting stop position. The stored auxiliary function states indicate how the originally entered auxiliary function states in the NC program entered have changed from those at the time that cutting stopped. When the command code representing the restart position is entered, processing moves from step 30 to step 36. In step 36, the travel values stored in step 33 are output to a servo system. This drives the axis motors 10 and 11 to move the cutting head 7 to the appropriate restart position. When the cutting head is moved to this restart position, commands are given to the cutting table 13 and laser oscillator 1 in step 37 to achieve the auxiliary function states stored in step 35. In step 38, automatic operation is resumed at a program block following the program block having the restart command code representing the restart position (referred to as the "resumption block").

The processing sequence will now be described in reference to the NC program in FIG. 4. In FIG. 4, M200 is a code representing restart. First, it is assumed that cutting has stopped during the execution of a block N40. If it is presumed that cutting was temporarily stopped after traveling a distance of 30 in the X-direction, which is part-way along the distance 100 in the X direction identified in the N40 block, the remaining distance is 70 in the X direction. This distance is stored in memory in step 26. Also, the auxiliary function states at the time block N40 stopped are stored in memory in step 27. In step 28, the next block (block N50) is entered. Assuming that the command M198 in the block N50 is a profile function starting command code, the stored profile function state among the auxiliary function states is updated (steps 31, 34 and 35).

However, the profile function is not yet activated in the actual laser cutting machine. Then, in step 28, a block N60 is entered. The block N60 contains a command for moving the cutting head a distance 100 in the Y direction. Thus, the travel value is again updated by adding 100 in the Y direction component of the travel value, in addition to the 70 added to the X direction component stored in step 26. However, the cutting head 7 of the actual laser cutting machine is not moved yet.

A block N70 is then entered. Since M200 in the block N70 is the code denoting the restart positioning, processing advances from step 30 to step 36. The travel values, which equal 70 in the X direction and 100 in the Y direction, are output to the motors in step 36. This output moves the cutting head 7 relatively to the desired restart position. Next, in step 37 the auxiliary function states are output and the profile function (from block N50) is activated in addition to the states stored in the step 27. Then, in step 38, the program is resumed from a block N80 and cutting is continued.

Another embodiment for a processing sequence from the restart position operation to restart execution will now be described. As in the first embodiment, the restart position is denoted by a specific command code in the program. However, in the present embodiment, processing is restarted at a program block that has already been executed, such that the restart position is located in a block preceding the block where cutting stopped. In this case, the process shown in FIG. 5 is performed not only when an automatic restart is made after a fault occurs but also when an ordinary program is executed. FIG. 5 is a processing flowchart which begins when one block of the NC program is entered and ending when a command is output. In step 39, a single block of the NC program command is entered. In step 40, the contents of the entered program command are analyzed. In step 41, it is determined whether the entered command is the restart position or not.

The restart position is indicated by a specific command code in the program. If this command code is not identified in step 40, the command does not correspond to the restart position and processing proceeds to step 42. In step 42, it is identified whether the command is an auxiliary function command or move command. If the command is the move command, a travel value is operated on in step 43. Then, the resultant travel value is stored in step 44, wherein an addition is made and the result is stored every time the move command is entered. If the command is an auxiliary function command, an operation is performed according to the contents of the auxiliary function command in step 45. In step 46, the travel values stored in step 43 are output to a servo system, thereby driving the motors 10 and 11. In step 47, auxiliary function commands are given to the cutting table 13 and laser oscillator 1.

Meanwhile, when the command code representing the restart position is entered, the processing proceeds from the judgement in step 41 to step 48. In step 48, the travel values stored in step 44 are cleared. In step 49, the auxiliary function states at that time are stored. By implementing the processing cycle at the time of ordinary program execution, the stored travel values indicate how far the current position is spaced from the newest specified restart position in the entered NC program. The stored auxiliary function states indicate those states in the newest specified restart position in the entered NC program. When the re-cutting command is entered to move the cutting head to the automatic restart position, the automatic operation may be restarted (as in steps 36, 37 and 38 in FIG. 3). For instance, the signs of the stored travel values are inverted and output to the servo system. After the cutting head movement is completed, commands are output to the cutting table 14 and laser oscillator 1 to achieve the auxiliary function states, and the automatic operation is resumed from the resumption block.

The code indicating the restart position should be inserted beforehand in a cutting break point, such as the beginning of a single-piece cutting program or the beginning of a drilling program ordinarily called as a subprogram for multiple-piece cutting, etc. When no fault occurs and the system need not carry out the restart position operation, cutting may be continued by ignoring the code representing the restart position. Alternatively, a command code, e.g., a subprogram call command, may be used as the code denoting the restart position.

A third embodiment for a processing sequence from the restart position operation to restart execution will now be described. If cutting is stopped while executing a positioning block, then cutting was not actually being performed by the laser beam 2 when stopped. Hence, the product currently being cut may be saved by moving processing to the end point (positioning target point) of that block and resuming the cutting at that point.

FIG. 6 is a processing flowchart from the restart position operation to restart execution where the end point of the block being executed, when a cutting operation is stopped, is used as the restart position. In the restart position operation, the remaining travel distance that is in the block being executed when stopped is stored in the memory in step 50. In step 51, the auxiliary function command states at the time cutting was stopped are stored in the memory. In step 52, the stored remaining distances are output to the servo system, to drive the axis motors 11 and 12 and move the cutting head 7 to the end point of the positioning block being executed (starting point of the next block). Upon completion of the head movement, commands are given to the cutting table 14 and laser oscillator 1 in step 53 to achieve the auxiliary function states stored in step 51. In step 54, automatic operation is resumed for the next block.

A fourth embodiment for the processing sequence from the restart position operation to restart execution will now be described. If cutting movement following a piercing operation is being carried out in the block when operation is stopped, the products being cut may often be saved. These products may be saved by executing a restart operation that begins at the starting point of the movement block. These products are salvageable since movement is often executed after the piercing operation in a cutting approach area which usually does not affect the product shape.

FIG. 7 illustrates a processing flowchart from the restart position operation to restart execution where the starting point command, that corresponds to the block being executed when cutting was stopped, is employed as the restart position. In the restart position operation, the distance actually traveled in the block being executed when cutting was stopped is stored in the memory in step 55. In step 56, the auxiliary function command states at the time cutting was stopped are stored in the memory. In step 57, the signs of the stored travel distances are inverted and the results are output to the servo system. This drives the axis motors 11 and 12, moving the cutting head 7 to the starting point of the block being executed. Upon completion of the cutting movement, commands are given to the cutting table 14 and laser oscillator 1 in step 58 to achieve the auxiliary function states stored in step 56. In step 59, the automatic operation is resumed in the block where cutting had been carried out. The automatic operation may also be resumed in a piercing operation block, with the restart position defined correspondingly. It will be recognized that the restart command given after a cutting stop is effected in these embodiments may also serve as a cutting stop command.

FIG. 8 is a processing flowchart for illustrating a further embodiment of the present invention, which defines a fault occurring during cutting and automatically restarts operation at the position of the fault according to the fault definition. More directly, if a fault occurs in the laser cutting machine in step 60, automatic operation is temporarily stopped in step 61. In step 62, it is checked whether an automatic restart is enabled by the switch on the control box 14, a parameter in the NC unit 15 or the like. If the switch, parameter or the like for enabling the automatic restart has not been set, the operator performs restart manually in a conventional manner (steps 10, 11 and 13). If the automatic restart has been enabled, the definition of the fault is checked in step 63. There are a variety of fault definitions, such as a programming error and an I/O data fault. While some faults may by their nature prevent the continuation of cutting, some faults may allow the cutting to be continued from the position at which the fault occurred.

For example, when the cutting head 7 nearly collides with the workpiece 5 for some reason, the detection signal from the profile sensor 9 or the signal from the tactile sensor 28 will indicate a fault. Also, if cut pieces of the workpiece 5 come into contact with the profile sensor 9 and/or tactile sensor 28, plasma is generated during cutting, or spatters splash, similar fault signals are output by the sensors 9 and 28. In the latter case, such fault signals are provided for a short period of time and ordinary cutting can be continued thereafter from the same position.

However, the present recovery method cannot be used in some cases because the machine may need to be stopped immediately after the fault, e.g., where the cutting head 7 is actually about to collide against the workpiece 5. In step 64, it is determined whether or not the fault definition checked in step 63 is a fault that allows the cutting operation to be automatically continued as described above. If cutting cannot be safely continued, a restart is impossible and cutting is stopped in step 65. If a restart can be made, a restart corresponding to the fault definition is made in step 66. In step 67, it is determined whether the restart has succeeded or not.

Various methods may be adopted to confirm that automatic operation has been started without the recurrence of a fault. This confirmation includes ensuring that the block, which was stopped halfway during automatic operation, has been completed, and ensuring that automatic operation has progressed satisfactorily for a certain period of time after it was restarted. If the restart is successful, the cutting is continued unchanged in step 68. If the restart is unsuccessful and the fault has recurred, the number of restarts is counted in step 69 and the restart is retried. However, if it is judged in step 70 that the number of restarts made has reached a predetermined number of times set by parameter or the like, the restart is not performed and the cutting operation is stopped in step 65. After cutting has been stopped in step 65, the operator performs the processing of steps 11 and 13 by conventional manual operation, or the power is automatically shut off.

A sixth embodiment of the present invention will now be described. FIG. 9 is a processing flowchart showing the sixth embodiment, which defines a fault occurring during cutting. In the sixth embodiment, if cutting is not restartable at the fault position, cutting is resumed at a position different from the fault position according to the definition of the fault. Referring to FIG. 9, steps 60 to 64 and steps 66 to 70 are identical to those in FIG. 8 in which the process attempts to restart cutting at the fault position. Once it is determined in step 70 that the number of attempted restarts has reached a predetermined number, the machine moves to a position different from the fault position in step 71 and a restart is executed in step 72. Although the product that was being cut will be rejected, the number of rejected parts can be minimized to one by continuing cutting at the other position.

Figure 10:
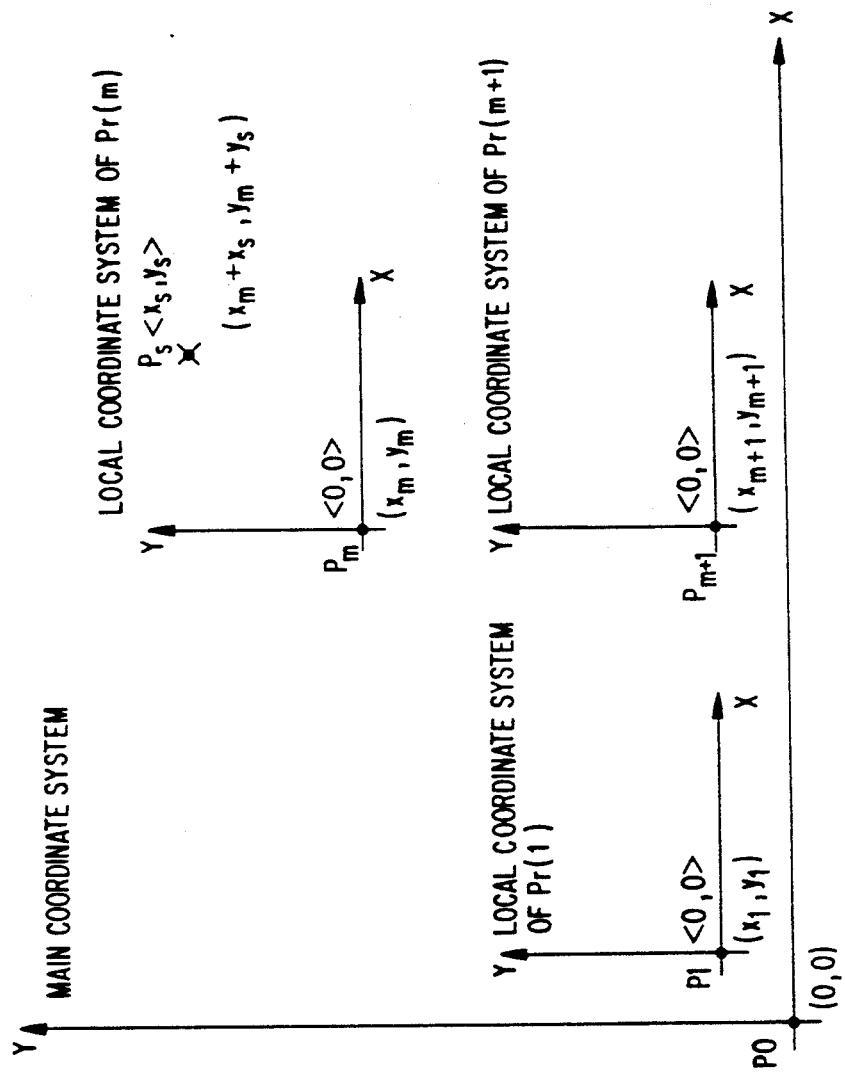
FIG. 10 illustrates a coordinate system setting procedure for a laser cutting program.

In general, a coordinate system for a multi-piece cutting program is as illustrated in FIG. 10. It is assumed that a cutting program starting position P0 for a cutting program Pr(0) is the point (0, 0) of the cutting program Pr(0) (this coordinate system is hereinafter referred to as the "main coordinate system"). Further, it is assumed that the coordinate values of a cutting starting position Pm of a subprogram Pr(m) on the main coordinate system are (xm and ym). In general, a coordinate system is set again with the cutting starting position Pm defined as the origin (0, 0) of the subprogram Pr(m) for cutting before the execution of the subprogram Pr(m) (this coordinate system is hereinafter referred to as the "local coordinate system"). Thus, a fault occurrence position Ps in the local coordinate system of the subprogram Pr(m) is xs, ys, while that position in the main coordinate system is (xm+xs, ym+ys).

The restart position movement means operates in a sequence shown in FIG. 11. First, the coordinates xs, ys of the stop position Ps are read (step S180). Next, the coordinate values (xm, ym) of the cutting starting position Pm Of the subprogram Pr(m) on the main coordinate system are read (step S181). The coordinates of the stop position Ps are converted into the coordinate values (xm+xs, ym+ys) in the main coordinate system (step S182). The coordinate system is re-set so that the coordinate values of the stop position Ps may be (xm+xs, ym+ys). The local coordinate system is switched to the main coordinate system through this process (step S183). The machine moves to the main coordinates (xm+1, ym+1) of the cutting starting position Pm+1 of the subprogram Pr(m+1) (step S184). The program to be executed next (subprogram Pr(m+1)) is called (step S185), and restart position movement processing is terminated. By performing a restart in the cutting starting position Pm+1 of the subprogram Pr(m+1), the coordinate system is set such that the coordinates (xm+1, ym+1) of Pm+1 are 0, 0, and the subprogram Pr(m+1) is executed.

The restart execution processing in step 66 in the embodiment described in accordance with FIGS. 8 and 9 will now be described in further detail. The restart execution procedure is carried out in accordance with the definition of a fault that has occurred. FIG. 12 is a processing flowchart illustrating restart execution processing. By way of example, it is assumed that the detection signal from the profile sensor 9 signifies a fault in the distance between the workpiece 5 and cutting head 7, and that the tactile sensor 28 has detected contact with the workpiece 5. In step 73, the fault detected is cleared.

It should be noted, however, that the fault detection function is not invalidated; rather, the fault is simply cleared and the fault detection function remains operational. In step 74, the laser cutting machine, e.g., the beam that has been switched off to ensure safety at the temporary fault stop, is returned to the status it had before the temporary stop. In step 75, the automatic operation terminated at the stop is restarted. If the restart is judged to be successful in step 67, the restart processing is completed. Although not shown in FIG. 12, if, after the fault has been cleared in step 73, the fault is detected again during the execution of restart processing, the restart is interrupted for a temporary stop. Thereafter, processing moves to step 69 according to the judgement in step 67, and the restart is retried.

Another embodiment of the restart execution processing will now be described. FIG. 13 is a flowchart illustrating this embodiment of restart execution processing for a fault, which is particular to the case where welding of the contact type profile sensor 9 with the surface of the piece being cut may have occurred. In a contact type profile sensor 9, the portion making contact with the workpiece 5 moves vertically according to the unevenness of the workpiece 5. This movement is measured by a differential transformer or the like. This vertically moving portion may operate improperly due to dust, etc. Once this sensor becomes bound it may remain motionless, until it is forced loose by vertically operating by the solenoid 10. In the latter case, there is a possibility that the cutting may be continued.

Referring to FIG. 13, the detected fault is cleared in step 76. It should be noted, however, that the fault detection function is not invalidated, but is kept operational, as usual. In step 77, the profile sensor 9 is moved vertically by the solenoid 10 to unbind the contact portion. In step 78, the laser cutting machine states are returned to the states they held before the temporary stop. In step 79, the automatic operation which had been stopped is re-started. If the restart is judged to be successful in step 67, the restart processing is completed. Although not shown, if the binding portion is not unbound and the fault is detected again after the fault is cleared in step 76 and vertical movement of the profile sensor 9 is attempted in step 77, the restart is interrupted for a temporary stop. Next, the processing advances to the step 69 according to the judgement in step 67, and the restart is retried.

It should be noted that the automatic restart enable device is provided with an enable switch in consideration of the case where the user does not desire an automatic restart. However, if the automatic restart is always desired, it may always be enabled beginning with the poweron of the machine, without the parameter, switch or the like provided.

Figure 14:
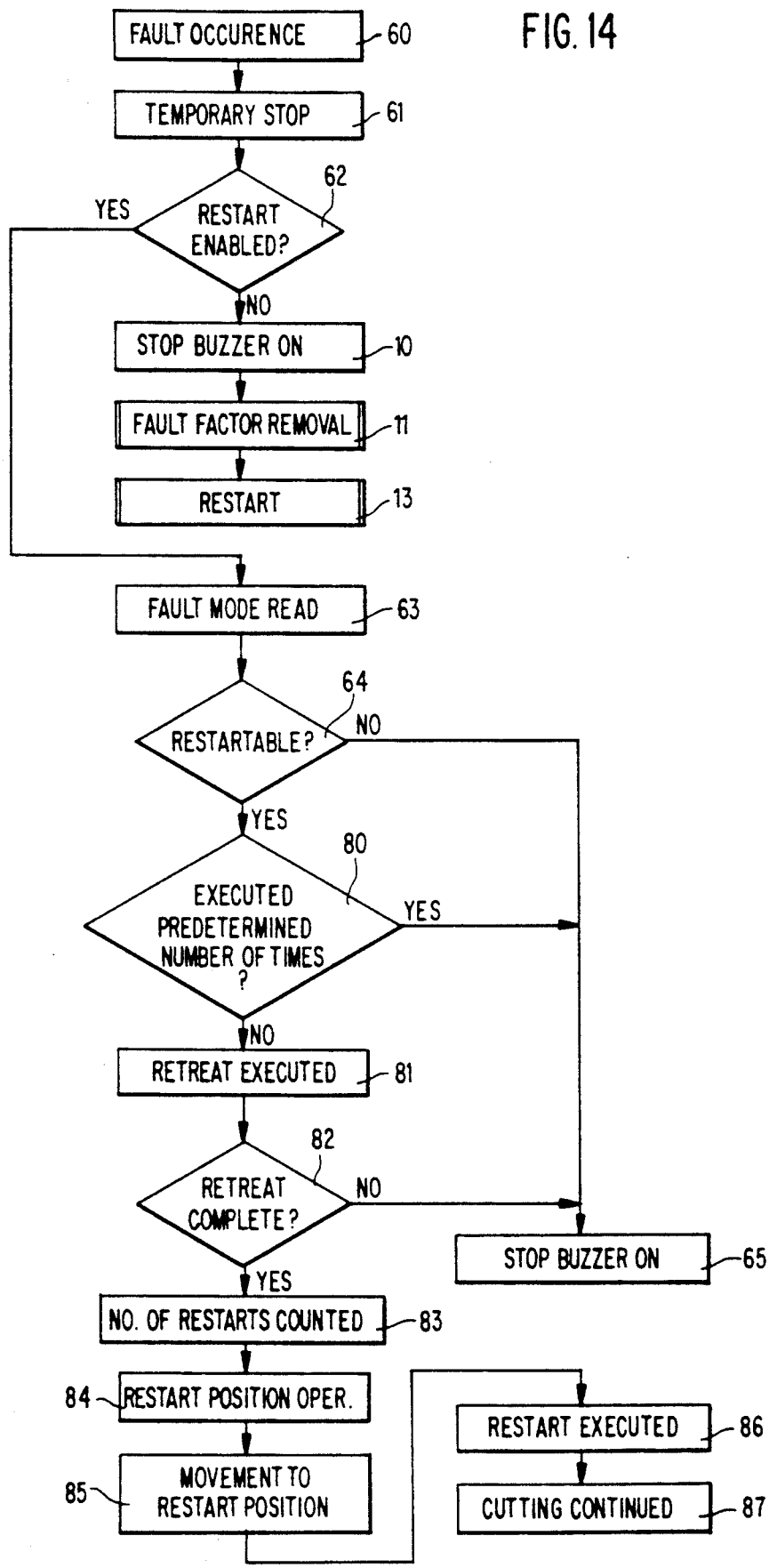
FIG. 14 is an automatic restart processing flowchart for a laser cutting machine in an eighth embodiment of the present invention.

FIG. 14 is a processing flowchart illustrating an eighth embodiment of the present invention, wherein steps 60 to 63 are identical to those in the embodiment shown in FIG. 9. In step 64, it is determined whether or not the fault definition checked in step 63 indicates a probability of an automatic continuation of the cutting. If the cutting cannot be continued, the restart is judged impossible and cutting is stopped in step 65. If the restart can be made, it is determined in step 80 whether or not the number of attempted restarts has reached the predetermined number set by parameter or the like. If the predetermined number has been reached, the restart is given up and cutting is stopped in step 65.

If cutting operation resumption is allowed to take place an unlimited number of times from a point other than the fault location, the number of rejected parts will increase, thereby wasting the workpiece body material. Hence, when the number of automatic restarts has reached a predetermined number, this is in itself identified as a fault, an alarm is provided, and the cutting is stopped.

The number of automatic restarts is counted in step 83. If the number of automatic restarts has not reached the predetermined number, the cause of the fault is removed in correspondence with the fault definition in step 81. Since the method of removing the fault cause depends on the fault definition, it is preferable to refer to a data table in which fault causes and fault recovery methods have been registered beforehand. For example, when the cutting head 7 nearly collides with the workpiece 5 for some reason or passes an already drilled portion while simultaneously profiling it, it is only necessary to raise the cutting head 7 in the Z-axis direction.

When the profile sensor 9 binds during a vertical movement, the profile sensor 9 may be moved forcedly vertically by the solenoid 10. When an instantaneous fault occurs in the profile sensor signal due to plasma, etc., a retreat operation may not be required. In step 82, it is determined whether the retreat operation is complete or not.

If the retreat is not complete, it is judged as an unrestartable fault and the cutting is stopped in step 65. If the retreat is complete, the number of automatic restarts is counted in step 83 and a restart position is then operated on in step 84. The machine moves to the restart position according to the result of operation in step 85 and executes the restart in step 86. In step 87, cutting is continued as it had been performed. If the fault reoccurs during the restart, the number of restarts is counted in step 83 and the restart is retried. In this case, however, processing may be restarted from step 60. After cutting has stopped in step 65, the operator performs the conventional manual operation of steps 11 and 13 or the power is automatically shut off.

FIG. 15 is a processing flowchart showing a further embodiment of the present invention, which allows a fault occurrence status to be checked by storing and displaying a restart status during cutting. If a fault occurs in the laser cutting machine in step 60, the automatic operation is brought to a temporary stop in step 61. In step 88, the fault occurrence status at the restart time is stored in the memory. The stored occurrence status includes which fault occurred, when it occurred and where it occurred. For instance, to store when the fault occurred, the date and time of day are stored. To store where the fault occurred, coordinates, a program number, a sequence number and a block number at the fault occurrence are stored. To store what fault occurred, an alarm number and an alarm message are stored. Then, the restart is made in step 89, and in step 90 the cutting is continued as it had been carried out. This restart method, as described in FIG. 12, may be applied to the present embodiment.

FIG. 16 shows a screen display example of the restart-time fault status stored as described above. Restart status displaying means may display stored information as shown in FIG. 16 when an assigned screen has been selected. In FIG. 16, display items include (from left to right) a date, a program number (0), a sequence number (N), a block number (B) and a fault definition or troubleshooting comment (i.e., if the sensor failed several times, replace sensor).

FIG. 17 shows another display example of the restart status. The NC unit 16, which displays the locus of the cutting machine movement on a graphic screen, is designed to mark each restart position made after a fault occurs and the status of the fault is stored in step 88. In FIG. 17, black points indicated by 52 and 53 represent the positions where restarts were made. This display offers at-a-glance recognition of where the restarts have been made in the product cut.

Figure 18:
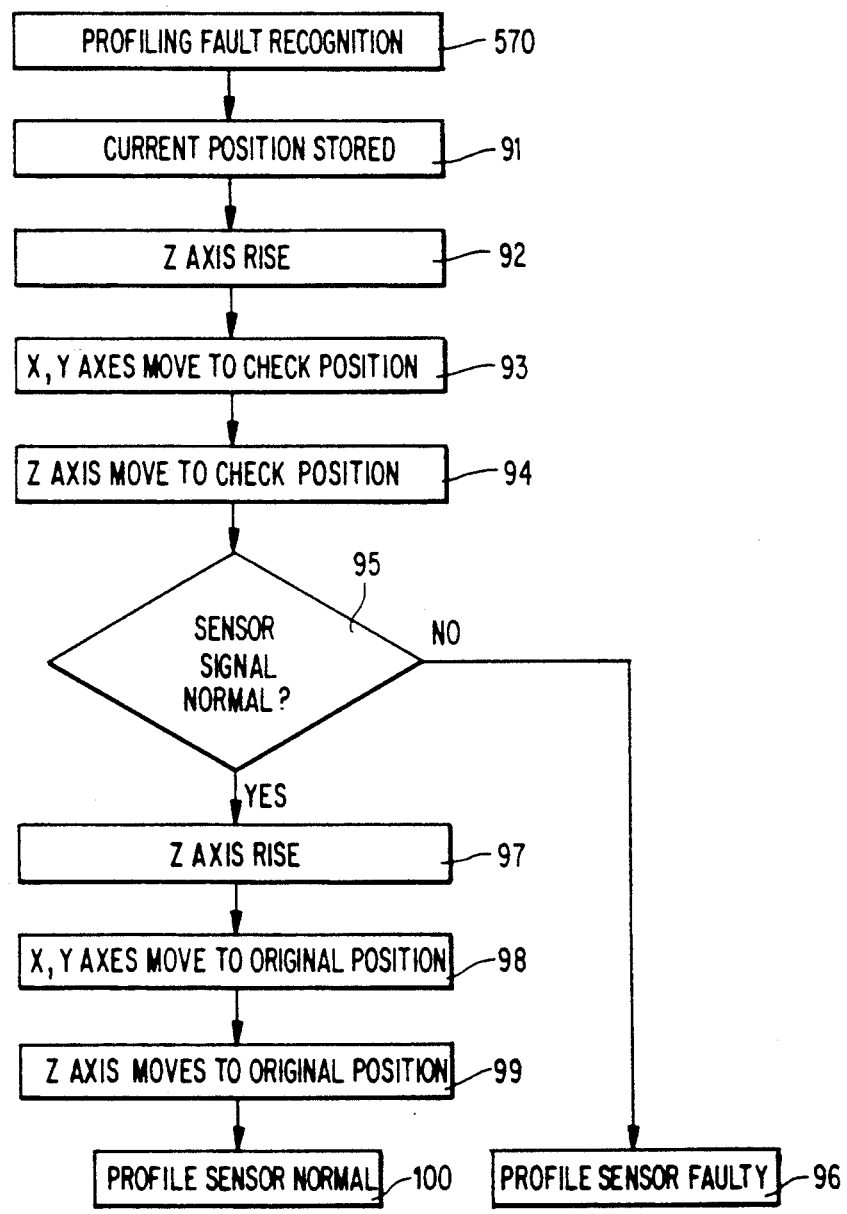
FIG. 18 is a sensor check processing flowchart for a laser cutting machine in an eleventh embodiment of the present invention.

FIG. 18 is a sensor check processing flowchart illustrating a further embodiment of the present invention, which allows a profile sensor signal to be checked in an automatically referenced position when a profiling fault occurs in the profile sensor, etc. When the profiling fault is detected in step 91, the current position is stored in the memory in step 92. At this time, the automatic operation has stopped. Although not shown, the profile sensor 9 fault check illustrated in FIG. 25 should be performed to ensure that the profile sensor 9 is not bound. In step 92, the cutting head 7 is raised to a proper height in order to avoid interference with the workpiece 5. Then, the X and Y axes are moved to a checking position in step 93 and the Z axis is moved to the checking position in step 94.

Prior to checking the position, an object should be installed to act as a reference point for the profile sensor 9. The sensor 9 detects a distance between the object and the sensor. The profiled area of the reference object should be small so that an offset of the position profiled by the profile sensor 9 from a normal range may be recognized.

A profile sensor signal, which is detected when the machine was located in the normal checking position, should be stored beforehand as a reference. When the movement to the checking position is completed in step 94, the detected sensor signal is compared with the reference signals in step 95. If the sensor signal detected at this time is outside the permissible range of the reference signals, the profile sensor 9 is judged as faulty and fault processing is performed in step 96. If the signal of the profile sensor 9 is within the permissible range of the reference signals, the profile sensor 9 is judged as normal and the processing progresses to step 97. In step 97, the Z axis is raised again as in step 92. Then, in step 98, the X and Y axes are moved to the position stored in the step 91. In step 99, the Z axis is similarly moved to the position stored in the step 91. This returns the machine to the original position after the sensor check. Then, in step 100, the processing for the normal profile sensor 9, such as a restart, is carried out. There is no problem in the continuation of the cutting since the machine has returned to the original position after the check on the profile sensor 9.

Figure 19:
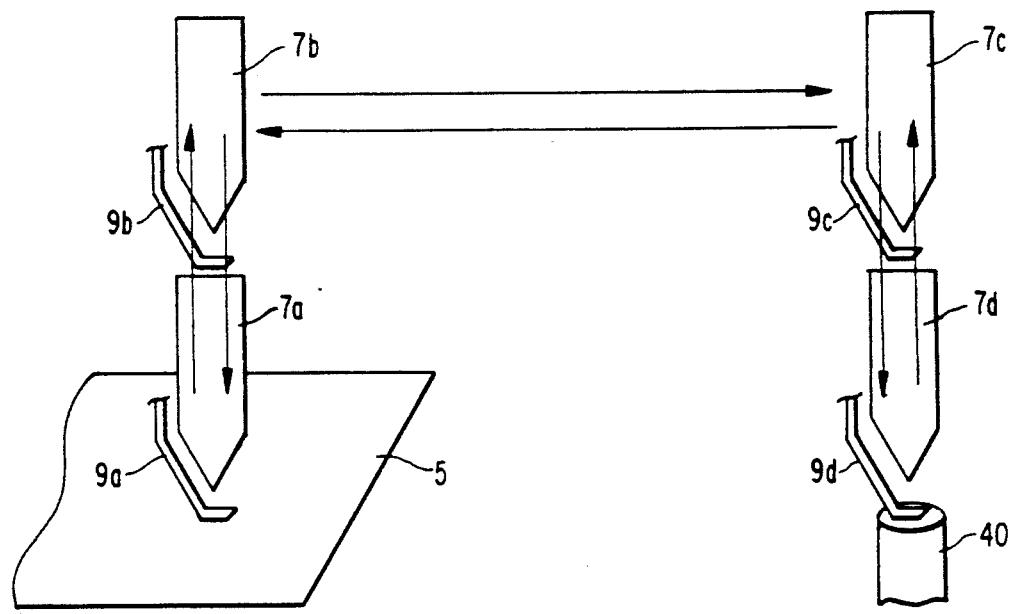
FIG. 19 illustrates the operation of the sensor check processing for the laser cutting machine in the eleventh embodiment of the present invention.

Processing will further be described with reference to FIG. 19, which illustrates a workpiece 5, cutting heads 7a-7d, profile sensors 9a-9d, and a reference object 40 for sensor checks. When a profiling fault occurs while the cutting head 7 is in position 7a, the X, Y and Z positions of the cutting head 7a are stored in the memory in step 91. In step 92, the cutting head is raised to a proper height in position 7b. Then, the X and Y axes are moved to the checking position as shown by the cutting head 7c in step 93, and the Z axis is moved to the checking position as shown by the cutting head 7d in step 94. When the movement to the checking position is complete in step 94, the detected sensor signal is compared with the range of the reference signals (also referred to as criterion) in step 95. If the signals of the profile sensors 9a to 9d are o within the permissible range of the reference signals, the profile sensors 9a to 9d are judged as normal and the cutting head is raised again in step 97. Then, in step 98, the X and Y axes are moved to the position of the cutting head 7b on the basis of the position stored in step 91. In step 99, the cutting head moves to the position 7a. This returns the machine to the original position after the sensor check. Then, in step 100, the restart, etc. is carried out.

The automatic sensor checking operation may be automatically initiated when the profiling fault is detected. Alternatively, if not during unmanned operation, the checking operation may be started by entering the signal of a key switch or the like from the control box 15 during a stop caused by the profiling fault. Whether an automatic start is made or not may either be set by parameter, etc., or specified in the NC program. When the parameter is used to start automatically, a sensor check mode is stored by setting a flag in memory when the parameter is switched on. When the program is used to set the automatic start, a sensor check command is stored by setting a flag when a specific code is entered. This allows the sensor check processing to be started automatically if the flag is set when the profiling fault occurs thereafter.

A procedure is described hereafter for storing the reference signals when it is difficult to store the reference signals prior to cutting. When a single detection signal at the checking reference position cannot be determined for the normal profile sensor 9 because the profile sensor 9 may be changed in installation height, the reference signals must be changed every time cutting is carried out. In such a case, the reference signals are stored when the automatic cutting operation is initiated or when the sensor checking command code is entered in the program (as a matter of course, when the profile sensor 9 is normal).

Figure 20:
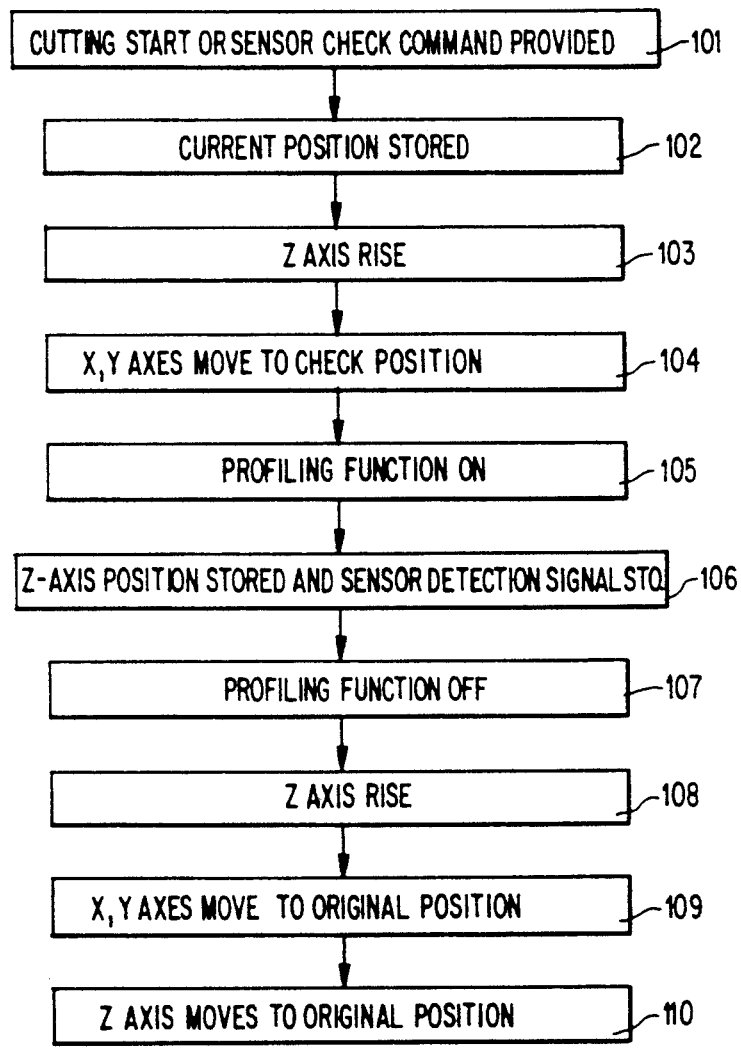
FIG. 20 is a sensor checking criterion data storing processing flowchart in the eleventh embodiment of the present invention.

FIG. 20 is a processing flowchart for an embodiment of the present invention for sensor checking reference signal storage processing. If a sensor checking state is reached in step 101 when a profiling fault is detected after the cutting has been initiated with the sensor checking command parameter on or when the sensor checking command code is entered, the current position is stored in memory in step 102. In step 103, the cutting head 7 is raised to a proper height in order to avoid interference with the workpiece 5. Then, in step 104, the X and Y axes are moved to the checking position. In step 105, the profiling function is switched on. This function lowers the cutting head 7, causing the distance from a reference object 40 in place of the workpiece 5 to be a set height.

Upon completion of the profiling operation, the Z-axis position and profile sensor 9 detection signal at that time are stored in step 106. Hereafter, the sensor signal may be used as the criterion (i.e., reference signals) and the Z-axis position used as the sensor checking position. Then, the profiling function is switched off in step 107, and the Z axis is raised again in step 108 as in step 103. Then, in step 109, the X and Y axes are moved to the position stored in step 102. In step 110, the Z axis is similarly moved to the position stored in step 102. This returns the machine to the original position after storing the Z-axis position and criterion for sensor check. There is no problem in the continuation of cutting because the machine has returned to the original position. The sensor installation height is not changed during the automatic operation cutting. Therefore, once the checking criteria have been stored, the sensor check can be performed automatically when a profiling fault occurs during cutting.

An embodiment in which cutting is stopped when a fault occurs and is restarted from the fault position after the fault is eliminated will now be described with reference to FIG. 26. Cutting is temporarily stopped in step S801. The cutting head 7 is then moved manually in step S802, and a fault factor is eliminated. Since the control box 15 is provided with a restart command switch 29 as means for commanding the cutting head 7 to move to a stop position, the user presses the switch 29 in step S803 after eliminating a fault factor in order to resume cutting. A command from the switch 29 is input to the NC unit 16, which then moves the cutting head 17 to the temporary stop position. By making a restart after that, the cutting is resumed from where it had been stopped temporarily.

Figure 27:
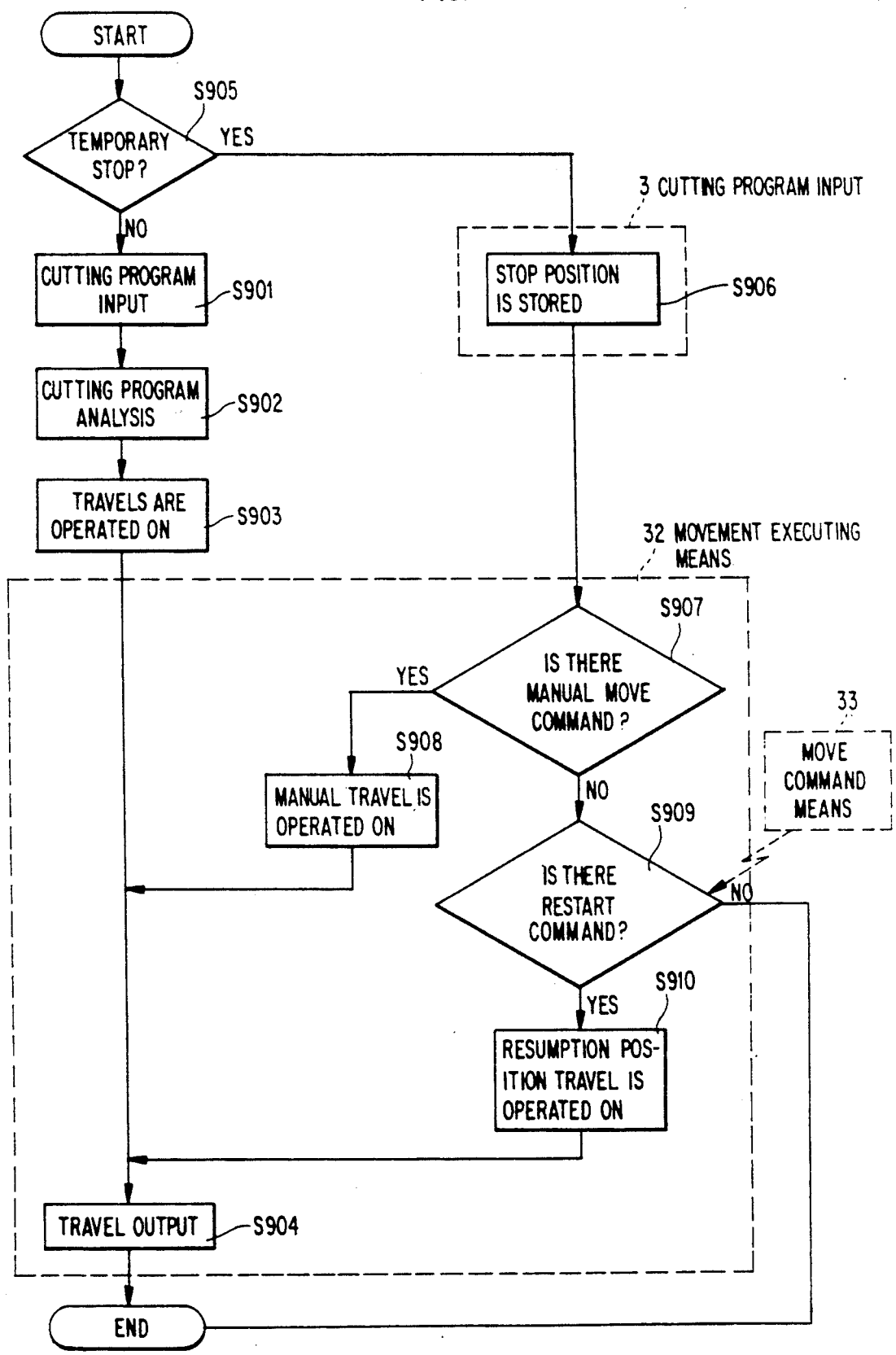
FIG. 27 illustrates an internal processing flowchart of the NC unit.

FIG. 27 is a flowchart illustrating the internal processing of the NC unit 16 that is carried out to resume cutting in the present embodiment. If the machine is not in a temporary stop state, steps S901 to S904 are repeated to run the cutting program. In step S901, one block of the cutting program is read. In step S902, command data in the read block is analyzed. If a move command is identified, travel values are operated upon in step S903. The travel of each axis is operated upon from a position identified in the program and from a current position. In step S904, the resultant travel distances are output to the servo system, which drives the X-axis motor 11 and the Y-axis motor 12.

When a temporary stop command is input, the output of the travel values operated upon in step S903 are immediately stopped in step S904. When it has been determined in step S905 that the machine has come to a temporary stop, processing transfers to the stop position storage means 31. In step S906, a temporary stop position is stored. Since the current position is always controlled depending on the travel distances output in step S904, storing the temporary stop position poses no problem. Step S906 is processed only when a temporary stop is effected. The processing then transfers to the movement executing means 32. In step S907, it is identified whether or not there is a manual move command. If it exists, the travel distances are operated upon in step S908 and output in step S904.

In step S909, it is identified whether or not a move command was stored from the move command means 33 while in the temporary stop state. The move command means 33 is equivalent to the restart command switch in step S803 in FIG. 26. If a move command was not input, no movement is made. If the move command existed, the travel distance for a movement to a resumption position (temporary stop position) is operated upon in step S910. The travel distance can be calculated from a difference between the position stored in the step S906 and the current position The travel distance calculated in step S910 is output in step S904 and the cutting head 7 is moved to the resumption position.

FIG. 28 illustrates the operation performed when cutting is resumed using the present invention. Assume that the machine came to a temporary stop at a midway point 1036 while a block for movement from point 1034 to point 1035 was being executed. Also assume that the cutting head 7 was manually moved to point 1037. When the restart command switch 29 is pressed in step S803, the cutting head 7 moves to the point 1036, where a restart is effected. The program is restarted in the temporary stop state and the cutting is resumed. While the restart is made after the cutting head 7 has been moved by pressing the restart command switch 29 in the above description, the restart may be effected with the restart command switch 29 ON to first move the cutting head 7 to the point 1036 and then resume the execution of the program.

What is claimed is:

1. A machining apparatus for cutting products from a workpiece, comprising:

laser beam means for generating a laser beam;

a cutting head for performing a cutting operation by focusing the laser beam onto the workpiece and by moving the laser beam relative to the workpiece along a desired path, in order to cut-out said products;

a cutting table for holding the workpiece; and information processing means for controlling movement of said cutting head based on program blocks of information, said information processing means comprising:

first memory means for storing cutting programs and data, said programs containing said program blocks which are used to control said cutting head;

second memory means for storing auxiliary function states and travel values for said cutting head;

fault detection means for detecting faults that occur during said cutting operation; and restart means for automatically restarting the cutting operation based on said stored travel values and auxiliary function states, when said fault detection means detects a fault, by commanding the cutting head to move the laser beam from a current position to a restart position and to restart the cutting operation, said current position corresponding to a point on the workpiece at which the fault occurred and said restart position being based on the travel values stored in the second memory means.

2. A machining apparatus according to claim 1, wherein said information processing means further comprises:

analyzing means for reading and analyzing each program block and for determining whether a program block being read corresponds to one of a restart position, a move command and an auxiliary function command, said restart means restarting the cutting operation when said analyzing means identifies a block that corresponds to a restart position.

3. A machining apparatus according to claim 2, wherein the restart position designated by the information processing means corresponds to one of an ending point of the program block being executed when the fault detection means detected the fault and a starting point of a program block identified by said analyzing means as corresponding to a restart position.

4. A machining apparatus according to claim 2, wherein said second memory means stores, as a travel value, a remaining travel distance corresponding to the program block being executed when the fault was detected, said remaining travel distance representing an amount of movement, designated by said executed program block, that the cutting head did not move before cutting was stopped s due to the fault, said information processing means storing said remaining travel distance when said fault is detected.

5. A machining apparatus according to claim 2, wherein said second memory means stores current auxiliary function states, which correspond to a condition of the apparatus when a fault is detected, in memory, said auxiliary function states including at least one of a radiation level of the laser beam, a profile function of the cutting head, and a cutting gas ON/OFF condition.

6. A machining apparatus according to claim 4, said information processing means further comprising:

travel value operating means for changing the travel value stored in the second memory means, when the analyzing means identifies a block to be a move command, based on a value of the move command.

7. A machining apparatus according to claim 5, said information processing means further comprising:

auxiliary function operating means for changing a state of one of said auxiliary functions stored in said second memory means, when the analyzing means identifies a block to be an auxiliary command, based on a value of said auxiliary command.

8. A laser cutting machine according to claim 1, further comprising:

restart counting means for counting a number of restarts; and restart position movement means for moving the cutting head relative to the workpiece to a restart position different from the position at which the fault occurred, when the number of restarts counted by said restart counting means exceeds a predetermined value.

9. A laser cutting machine according to claim 1, further comprising:

fault recovery means for recovering from a fault state based on the identified type of fault; and restart position movement means for moving the cutting head relative to the workpiece to a restart position, which differs from the position at which the fault occurred, said restart position being identified by program stored in memory.

10. A laser cutting machine for performing a cutting operation on a workpiece, comprising:

a laser source for generating a laser beam;

a cutting head for using the laser beam to perform the cutting operation;

a cutting table, positioned near the cutting head, for holding the workpiece;

a fault detector for detecting faults in the cutting operation;

memory for storing a program, travel values and auxiliary function states; and an information processing unit for controlling movement of said cutting head based on the program, said information processing unit comprising:

a restart enable unit for determining, when a fault is detected, whether an automatic restart is selected;

a fault mode determining unit for identifying a fault type and for determining whether cutting can be automatically restarted after the identified fault type; and a restarting unit for performing an automatic restart operation, when the automatic restart is selected and when the identified fault is of a type, from which cutting can be automatically restarted.

11. A laser cutting machine accordingly to claim 10, further comprising:

a restart counter for counting a number of restarts; and an alarm output unit for providing an alarm when the number of counted restarts has exceeded a predetermined value.

12. A laser cutting machine according to claim 10, further comprising:

a restart counter for counting a number of restarts; and a restart position movement unit for moving the cutting head relative to the workpiece to a restart position different from the position at which the fault occurred, when the number of restarts counted by said restart counting means exceeds a predetermined value.

13. A laser cutting machine according to claim 10, further comprising:

fault recovery means for recovering from a fault state based on the identified type of fault; and restart position movement means for moving the cutting head relative to the workpiece to a restart position, which differs from the position at which the fault occurred, said restart position being identified by program stored in memory.

14. A laser cutting machine according to claim 10, wherein the restart position is one of the starting point and end point of a block currently being executed.

15. A laser cutting machine for performing a cutting operation on a workpiece, comprising:

a laser source for generating a laser beam;

a cutting head for using the laser beam to perform the cutting operation;

a cutting table, positioned near the cutting head, for holding the workpiece; a fault detector for detecting faults in the cutting operation; and information processing means for controlling movement, said information processing means comprising:

automatic restarting means for performing an automatic restart after a fault is detected;

restart status storing means for storing a current status information of the apparatus when an automatic restart is made, said current status information including at least one of a type of fault that was detected, a position of the cutting head when the fault was detected and the time at which the fault was detected; and restart status displaying means for displaying said stored current status information.

16. A laser cutting machine according to claim 15, wherein the restart status displaying means displays a restart status together with a cutting shape on a graphic screen.

17. A laser cutting machine according to claim 15, further comprising:

a profile sensor for detecting the position of the workpiece relative to the cutting head to identify a profiling fault.

18. A laser cutting machine for cutting products from a workpiece comprising:

a laser oscillator for oscillating a laser beam;

a cutting head including a condenser for gathering the laser beam oscillated by said laser oscillator;

a cutting table for holding the workpiece;

means for detecting a fault and for stopping a cutting operation when a fault is detected and for storing a cutting stop position; and move command means for commanding said cutting head to move to said cutting stop position 19. A laser cutting machine as set forth in claim 10, further comprising:

restart counting means for counting a number of attempted restarts; and alarm output means for determining a fault and providing an alarm if the number of attempted restarts counted by said restart counting means exceeds a predetermined number.

20. A laser cutting machine including a profiling function, comprising:

means for storing a fault occurrence position at the occurrence of a profiling fault;

means for moving a cutting head to a reference position and checking a profile sensor signal;

means for returning the cutting head to said stored fault occurrence position; and means for attempting a restart after the cutting head returns to the fault occurrence position.

* * * * *